April 4, 1944.  B. W. WILLIAMS ET AL  2,346,098
CARDIOMETRIC APPARATUS
Original Filed March 20, 1940  7 Sheets-Sheet 3
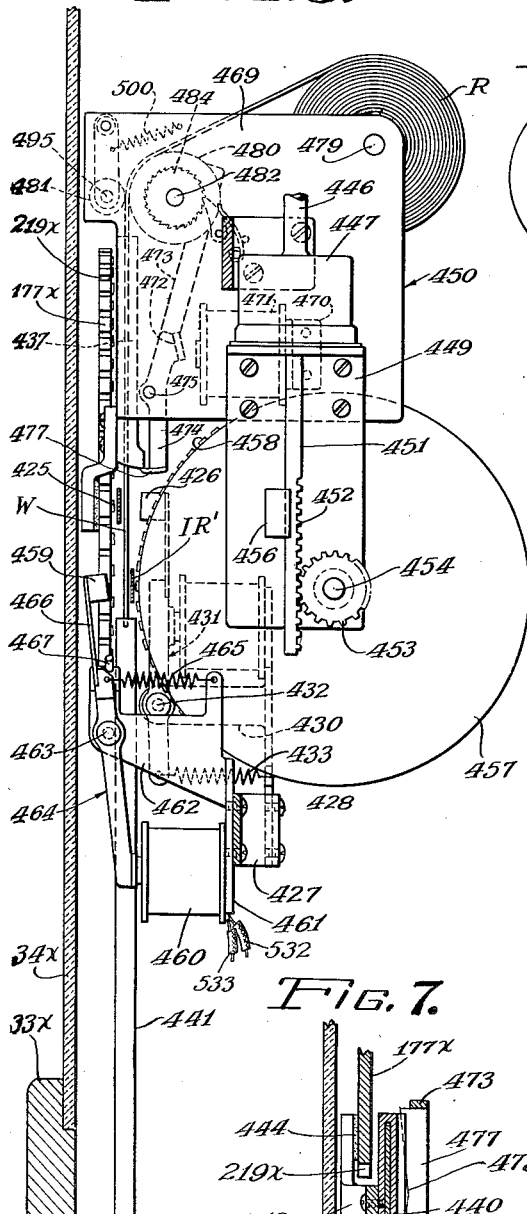
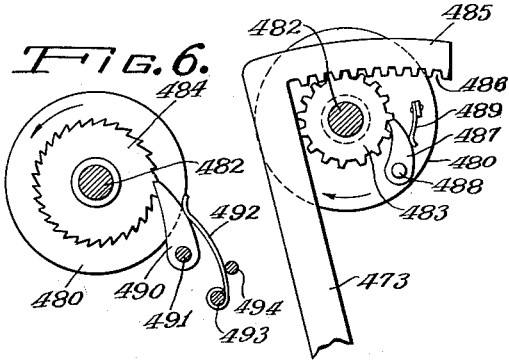
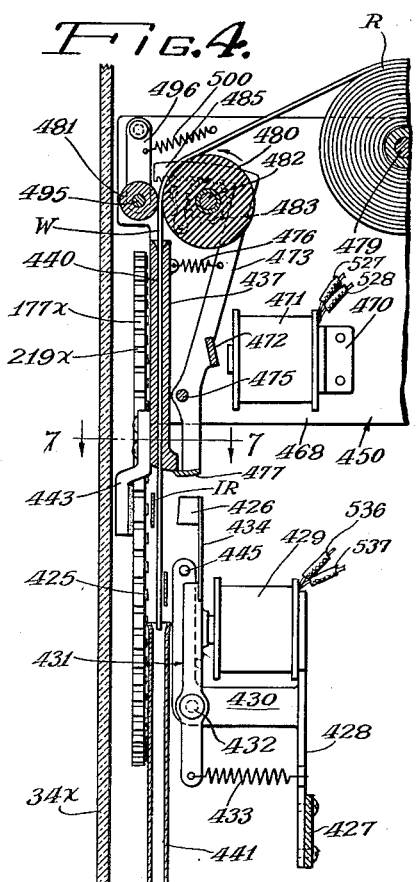
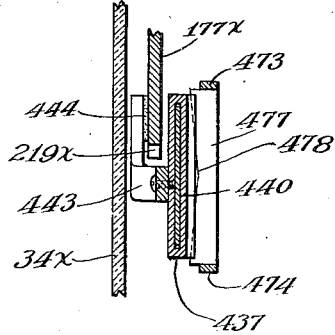
Inventors:
Bradlee W. Williams
Homer S. Williams
By Bell, Wallace and Cannon
Attorneys April 4, 1944.   B. W. WILLIAMS ET AL   2,346,098
CARDIOMETRIC APPARATUS
Original Filed March 20, 1940   7 Sheets-Sheet 4
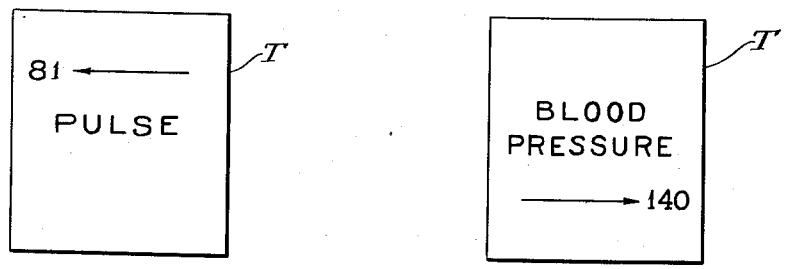
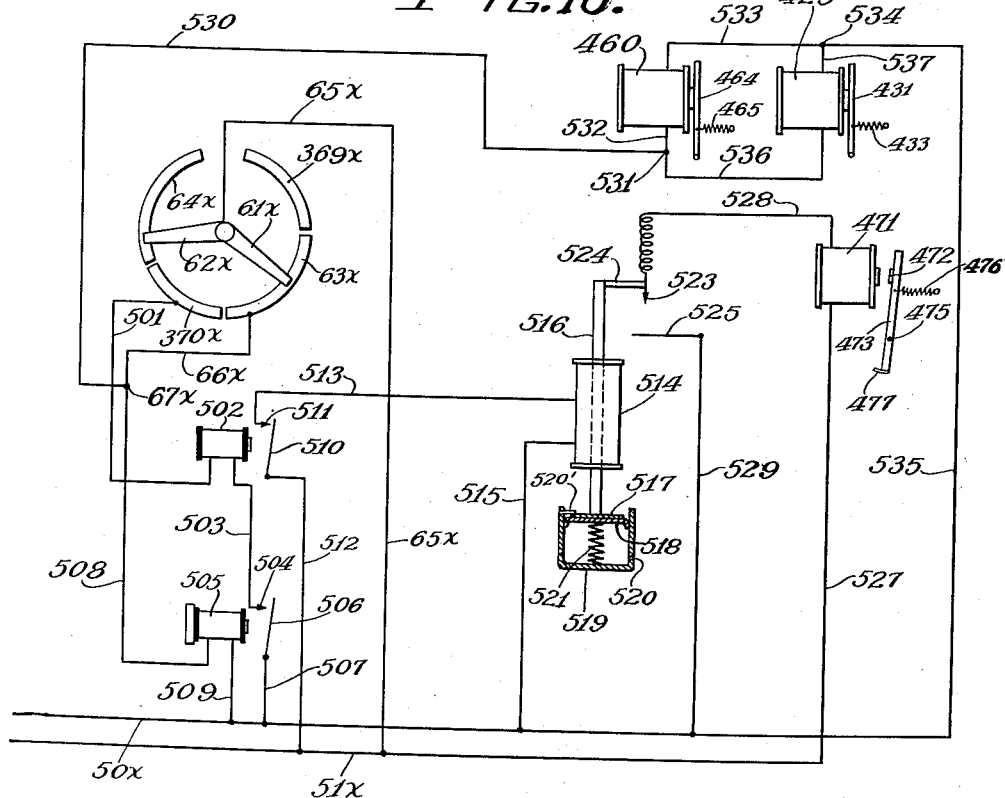
Inventors:
Bradlee W. Williams
Homer S. Williams
By Bell, Wallace and Cannon
Attorneys

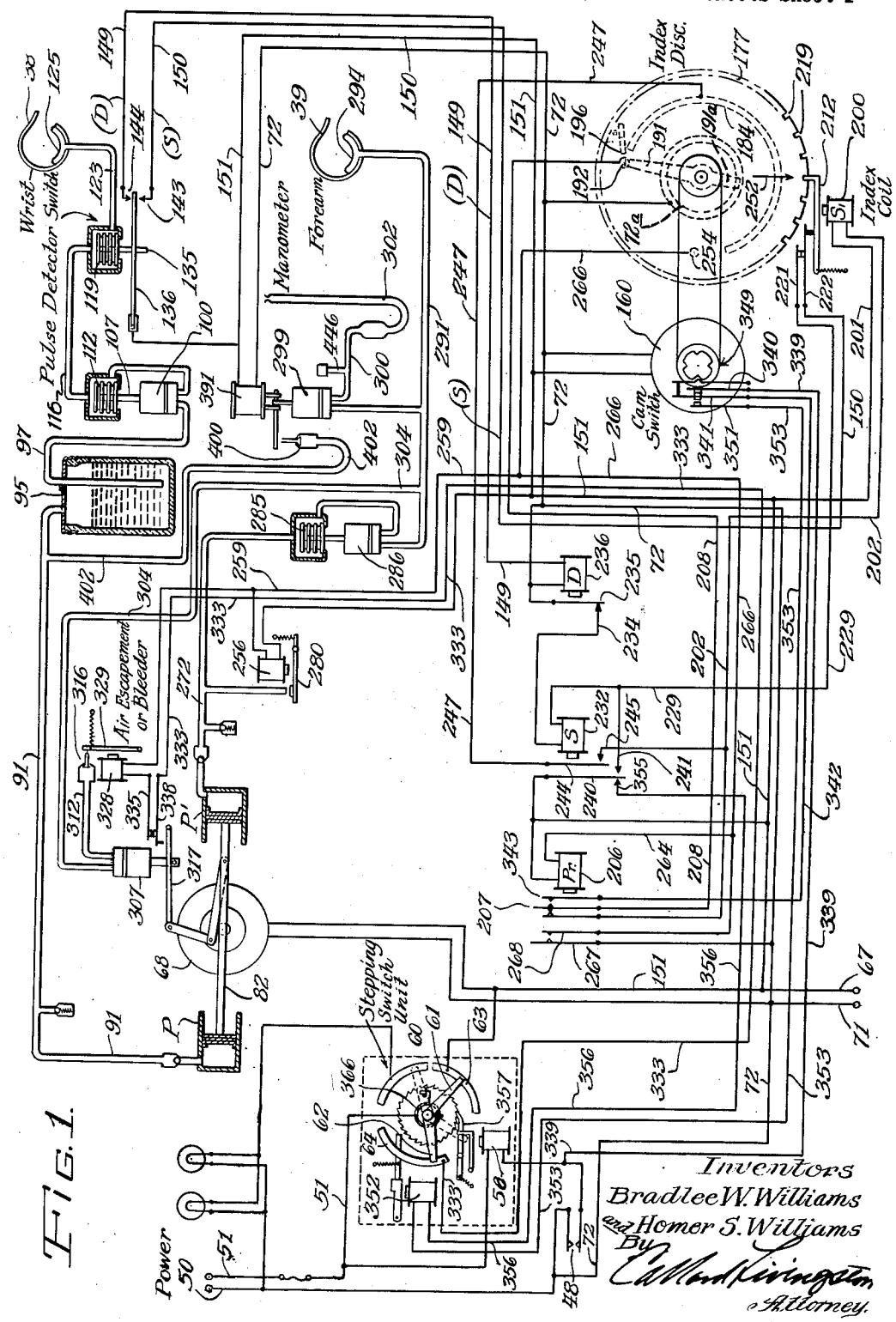

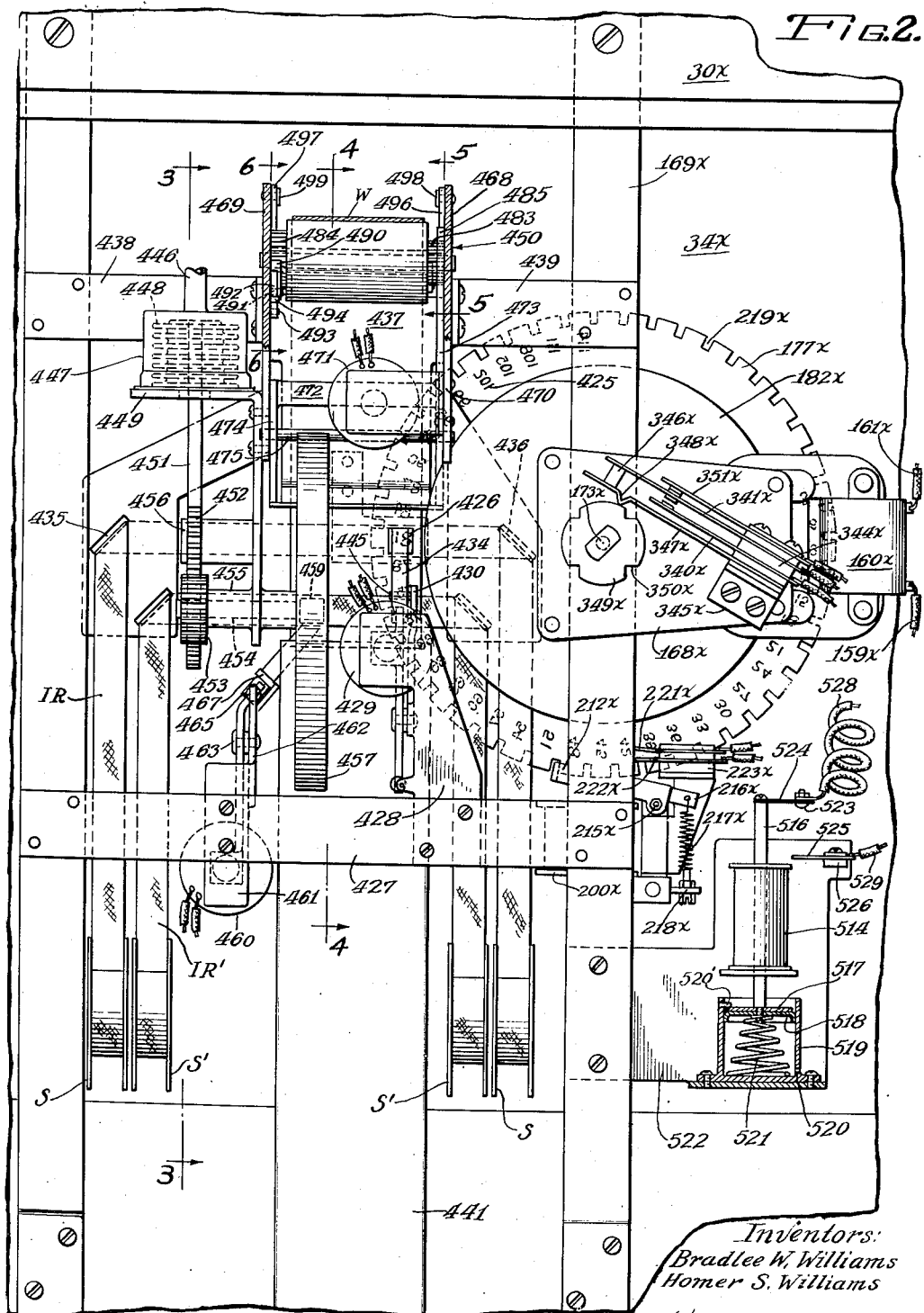

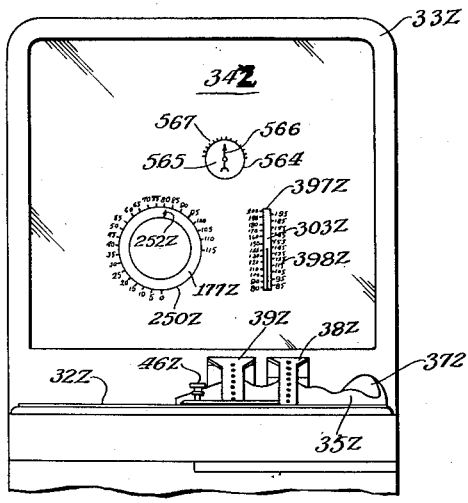
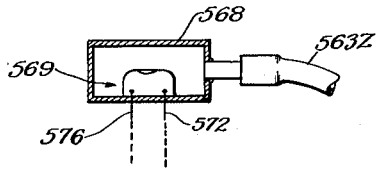
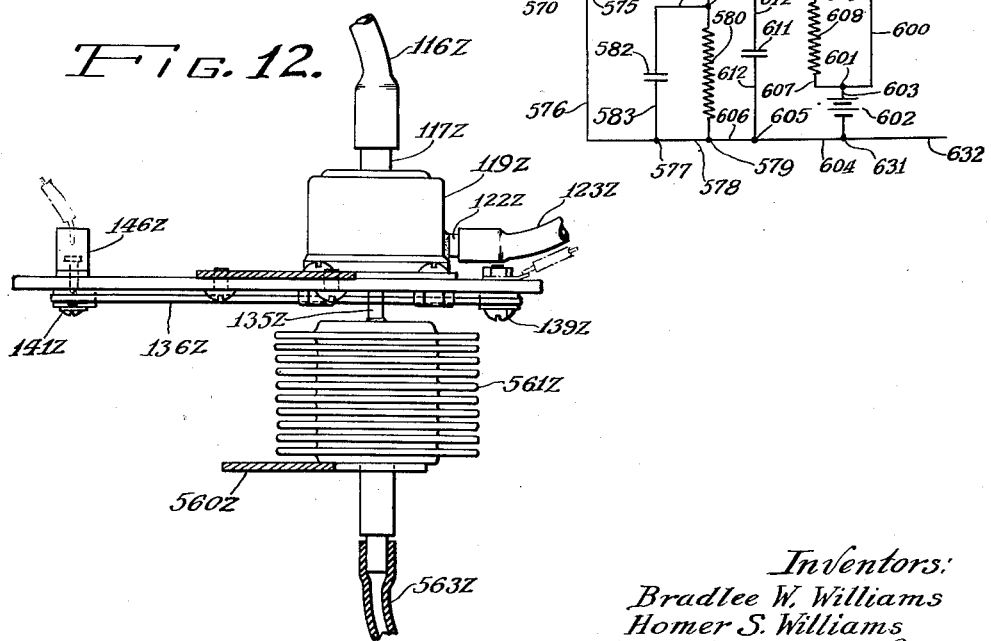

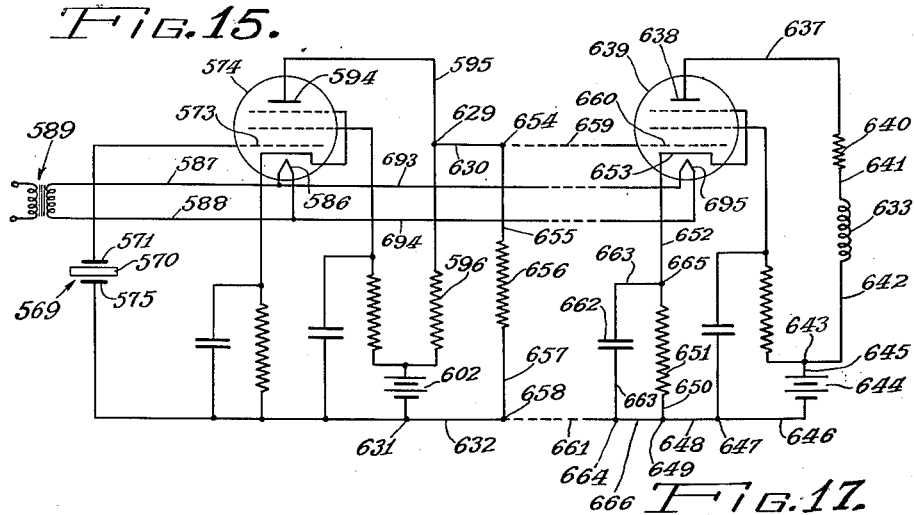
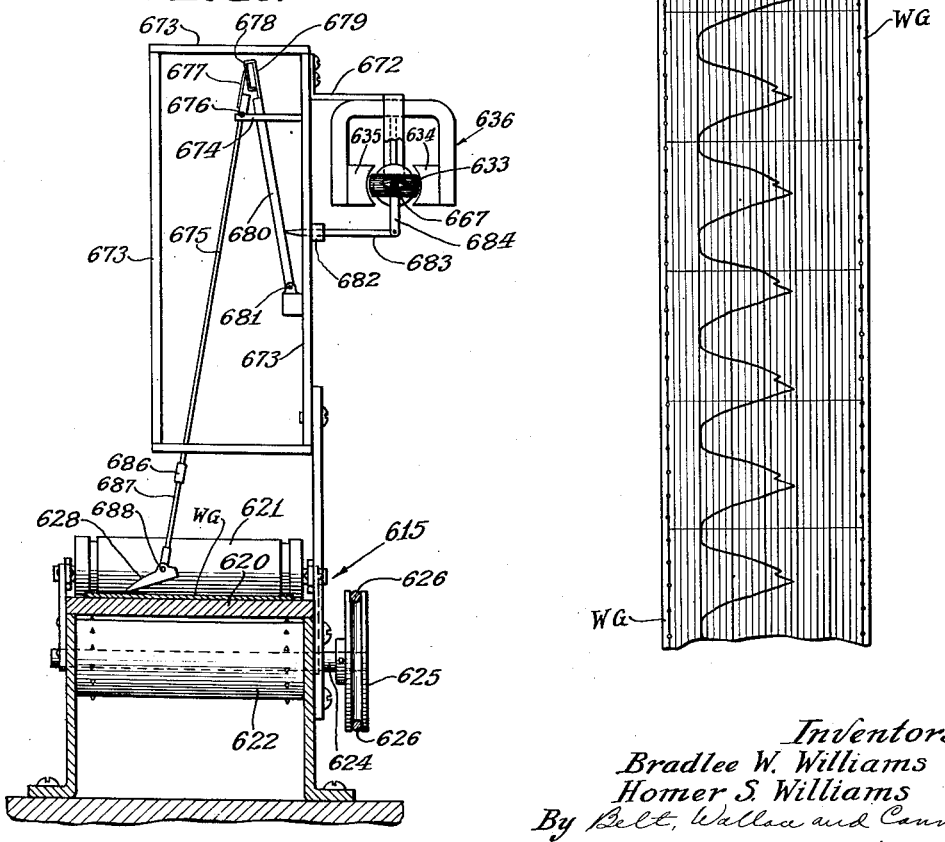

April 4, 1944.   B. W. WILLIAMS ET AL   2,346,098
CARDIOMETRIC APPARATUS
Original Filed March 20, 1940   7 Sheets-Sheet 7

Inventors:
Bradlee W. Williams
Homer S. Williams
By Belt, Wallace and Cannon
Attorneys Patented Apr. 4, 1944

2,346,098

UNITED STATES PATENT OFFICE 2,346,098

CARDIOMETRIC APPARATUS

Bradlee W. Williams and Homer S. Williams, Chicago, Ill., assignors to Tech Equipment Company, Chicago, Ill.

Original application March 20, 1940, Serial No. 325,017. Divided and this application June 19, 1941, Serial No. 398,780

32 Claims. (Cl. 128—2.05)

This invention relates broadly to apparatus for detecting, manifesting, and recording pulsating phenomena, particularly with respect to a fluid pressure system, and most especially with respect to the circulatory system of the human body, the invention being illustrated and described herein in connection with apparatus for detecting the pulses in the arterial system of the human body, manifesting the frequency and intensity of such pulses, indicating the relative blood pressure in said system, and variously indicating and recording these data.

Among the important objects of the invention are the provision of a combination of mechanisms arranged to cooperate automatically to ascertain the blood pressure of the user of the machine, hereinafter referred to as the subject, and to produce a permanent record of such pressure, as well as the subject's pulse rate; and in addition, or in the alternative to produce a graphical representation of the wave form of the pulsations which will be a function of the pulse rate and arterial tension, and thus provide a form of cardiogram which in the preferred arrangement may be detached from the machine and delivered to the patron or subject.

Further objects relate to the provision of automatically co-operating mechanism to apply a pressure to certain portions of the body—the subject's arm, for example, to sense arterial pressures, and mechanism for automatically equalizing such pressure to the arterial pressure to manifest the relative blood pressure of the subject, together with means for setting and printing type automatically to produce a record of the blood pressure.

A further object is the provision of automatic type setting means, cooperable with the aforesaid mechanism for providing a printed record of the blood pressure, to produce in addition, a printed record of the pulse rate of the subject.

Another object is the provision of means operating automatically to provide a visible indication, in addition to, or distinct from, the aforesaid printed record.

A still further object is the provision of a novel pulse and arterial tension sensing means which utilizes piezo-electric principles to provide a pressure responsive means and control mechanism for manifesting and recording the pulse rate and the blood pressure of the subject.

Yet another object is the provision of means for automatically setting up a closed fluid pressure system in conjunctioin with means for effecting pressure and pulsating variations in said system corresponding to pressure and pulsatory conditions existing in the arterial or circulatory system of the subject or user of the apparatus, together with means utilizing pulsating effects as aforesaid for controlling a cooperating indicating mechanism for indicating, graphically and otherwise, either or both the pressure and pulsating phenomena peculiar to the subject at the time of use of the apparatus as aforesaid.

A further object is the provision of improvements in cardiometric apparatus or the like, in which there is a means for occluding the blood flow in an artery, wherein the improvement resides in mechanism for automatically testing for a plurality of pulsations in an interval occurring between a variatfon in the occluding pressure, and utilizing the pulsations or absence of pulsations to control the means for varying the occluding pressure.

Still further objects are to electrically manifest the force and magnitude of pulsatory cardiac effects sensed in the course of operation of the apparatus; to enable relatively weak and limited movements induced in the course of operation of the apparatus to be utilized for effecting selected operatior s therein; to enable relatively weak and limited movements induced in the course of operation of the apparatus to be so amplified that power-entailing operations may be effected therefrom; to enable such operations to be effected by the utilization of electronic tubes; to utilize pressure responsive means for effecting variations in electrical circuits and to bring about predetermined operations under control of such pressure responsive means; to produce a graphic illustration of functions sensed in the course of operation of the apparatus; and to produce a graph illustrative of the force and magnitude and other aspects of such pulsatory effects—particularly systolic effects sensed in the course of operation of the apparatus.

Other objects and novel aspects of the invention relate to certain details of construction as well as the functional cooperation and integration of the component parts of the illustrative embodiment hereinafter described in view of the annexed drawings in which:

Fig. 1 is a schematic layout of a complete pulse rate and blood pressure apparatus with which the present invention is intended to cooperate;

Fig. 2 is a rear elevation, with portions in section, of one part of the means for automatically printing the pressure and pulse rate readings showing the pulse-rate type-drum particularly;

Fig. 3 is a side elevation looking in the direction of lines 3—3 of Fig. 2, showing the pressure type-drum and printing means particularly;

Fig. 4 is a vertical section through the recording means of Fig. 2 taken along lines 4—4 thereof and showing parts of the web feeding means and pulse rate imprinting means;

Fig. 5 is an enlarged fragmental detail of the web advancing rack seen along lines 5—5 of Fig. 2;

Fig. 6 is an enlarged fragmental detail of the anti-retrograde ratchet for the web feeding roller;

Fig. 7 is an enlarged fragmental section of the web feeding guide looking along lines 7—7 of Fig. 4;

Figs. 8 and 9 are views respectively of the pulse rate and blood pressure record or indicia cards cut from the web for delivery to the patron;

Fig. 10 is a circuit diagram for the record printing mechanism;

Fig. 11 is a front elevation of the upper portion of the cabinet adapted to house the apparatus;

Fig. 12 is a top plan view of the pulse-translating device used to impose control of the pulses upon the recording means;

Fig. 13 is a sectional detail of the piezo-electric detector unit or transduction means.

Fig. 14 is a circuit diagram for the galvanometric indicating mechanism;

Fig. 15 is a circuit diagram for the cardiograph unit;

Fig. 16 is an end elevation partly in section of the cardiograph unit;

Fig. 17 is a plan view of a graph webbing representing the cardiogram as delivered to the patron;

Figure 18:
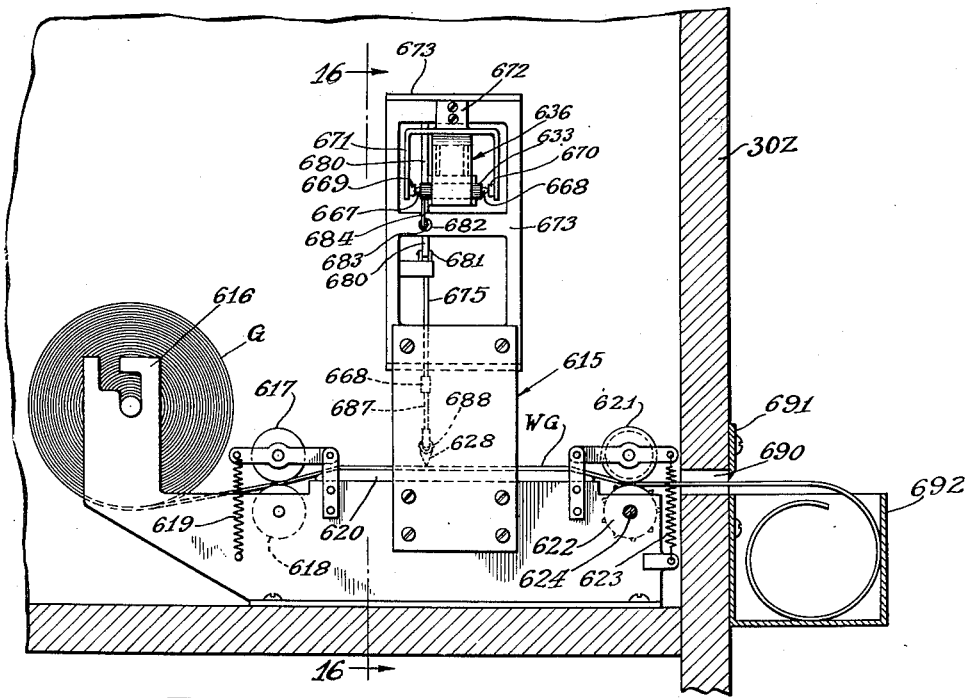
Fig. 18 is a side elevation of the cardiograph unit.

This application is divided from our original application S. N. 325,017, filed March 20, 1940, and now matured into Patent No. 2,249,370, dated July 15, 1941, wherein there is shown, described and claimed certain automatically operable apparatus for ascertaining and manifesting the pulse rate and relative blood pressure of individuals using the apparatus, which is, in one of its preferred forms, adapted for coin-controlled operation.

In the patented arrangement the pulse rate may be indicated by a direct reading scale or dial, while the blood pressure may be indicated by a direct reading pressure responsive instrument such as a mercury manometer or the like. The present invention provides additional mechanism for indicating the pulse rate, the pressure, and other related cardiometric data by means of a printed record.

To assure a clear understanding of the purposes, construction, and mode of operation of the present novel recording mechanism, one arrangement in which it may be successfully utilized is shown schematically by way of example in Fig. 1. A similar circuit arrangement, except as to the present novel features, will be found in the aforesaid patent.

The apparatus shown in Fig. 1 herein depicts schematically a complete blood pressure and pulse rate ascertaining means including a pulse sensing, detecting, or pick-up device of which the arm rest 35Z (Fig. 11) constitutes a part, together with a pair of straps 38Z and 39Z by means of which the forearm of the patron or subject is strapped in the rest against a pair of inflatable rubber cushions 125 and 294 (Fig. 1), respectively positioned in the bottom of the arm rest so that the straps 38Z and 39Z will overlie the same and hold the arm thereagainst when the straps are fastened.

When the subject's forearm is strapped in the rest 35Z as aforesaid, the volar aspect of the wrist is held against cushion 125 by strap 38, while the volar face of the forearm at a point between the wrist and elbow (approximately half-way) is held against cushion 294 by strap 39.

By depositing a proper coin in a slot (which is not seen, but which is situated adjacent the button 46Z, Fig. 11) apparatus shown in Fig. 1 is set into operation owing to closure of coin switch 48, which renders main power conductors 72 and 151 active by resetting a stepping switch 60 to starting position so that its power wiper 61 will engage contact 63 and close circuit from power line conductor 51 to conductor 151.

When power is thus applied, a pump motor 68 drives pumps P and P' to build up pressure in a fluid circuit, which includes inflatable cushions 125 and 294 to effect inflation of the latter in a certain manner to be described.

The pump P at the left connects through conduit 91 to a liquid reservoir 95 containing water or other suitable liquid. By building up pressure in the reservoir the liquid is forced through conduit 97 and past valve 100 through bellows 112 and 119 via tube 116 and conduit 123 into the cushion 125, which will be referred to hereinafter as the "lower" or "sensing" cushion because it is closest to the wrist and functions to sense or detect the pulsations in the radial artery, which lies close to the volar face of the wrist at this point.

Cushion 125 expands against the subject's wrist until it exerts a pressure approximately 2¼ lbs. per square inch, which is sufficient to provide a firm and sensitive contact adequate to respond with average fidelity to both weak and strong pulses. When this predetermined pressure is reached, communication is cut off automatically between the pump and cushion 125 by the action of back pressure against bellows 112 which exerts a force through stem 107 to close valve 100, the bellows and valve being adjusted to operate at such predetermined pressure.

At this time the right-hand pump unit P' is also being driven but to no useful effect because an electromagnetic valve means 280 in the pressure branch 272 is open and will not be closed until later in the cycle of operation. The apparatus is now in condition to acertain the pulse rate of the patron, whose pulses are being transmitted into the hydraulic or fluid pressure cushion 125 and thence also to the bellows 119, which is adequately sensitive to vary correspondingly and operate a sensitive switch including a movable contact means 136 and a pair of stationary contacts 143 and 144.

Contact arm 136 preferably rests in adjustable frictional engagement with bellows stem 135 so that relatively great or sudden displacements of the bellows (as by a nervous movement of the patron's arm in the rest 35Z (Fig. 11)), will not rupture the sensitivity adjusted switch means. Such an arrangement is described in detail in our aforementioned patent, and in our copending application S. N. 404,304.

In response to the pulses thus transmitted to bellows 119, contact 136 alternately engages contacts 143 and 144 following each normal systole and diastole and corresponding increase or decrease in arterial tension. For this reason, the letter S is conveniently applied to the circuit including contact 143 of the sensitive switch, while letter D is applied to the circuit of contact 144, indicating the circuits respectively controlled by systolic and diastolic pulses (along with their respective relays similarly marked).

For each systolic impulse, relays 232 S is energized via the detector switch contacts 136, 143, conductor 159, index clutch switch contacts 221, 222, conductor 229 to the winding of the relay S.

It should be observed that the other terminal of this systolic relay winding connects to power conductor 72 through normally closed contacts 234—236 on the diastolic relay D 236. It should also be observed that as soon as the systolic relay pulls up, it locks its own circuit and remains pulled up until the diastolic relay is energized by action of the sensitive or detector switch in response to a succeeding diastolic pulse. This is accomplished by closure of contacts 240—241 connecting power lead 151 to conductor 229 as soon as the systolic relay pulls up.

In consequence of the aforesaid operation of the systolic relay, the contacts 244—245 thereof energize coil 200 (also marked $S_1$) of the index clutch via conductor 202 (return conductor 201 from this coil connecting to power lead 151). As a result, the clutch pawl 212 of this index coil is withdrawn from a notch 219 in an index disc 177 which is constantly driven through a slip-clutch arrangement (not seen) such as is described in detail in said patent, by motor 160, the disc being normally restrained against rotation because pawl 212 engaging in a notch 219 is sufficient to prevent such movement of the disc against the driving effort of the slip clutch (a counterpart of this disc is shown in the modified structure 177X, Fig. 2, the pawl being identified at 21x).

As soon as pawl 212 is withdrawn as aforesaid, index switch 221—223 is opened and the circuit to the winding of the systolic relay from the detector switch is broken, although the relay holds up because of its own locking circuit heretofore described, so that the index coil $S_1$ holds up also.

Meanwhile, the index disc 177 begins to move at a predetermined rate calculated to permit its displacement about ten or twelve degrees of arc between successive average systolic and true diastolic pulsations.

As soon as the immediately succeeding diastolic pulse follows, the diastolic relay coil 236 D is energized via sensitive or detector switch contacts (136—144) which are closed by the retractive motion of rod 135 owing to contracting movement of bellows 119 in the diastolic phase, conductors 149 and 72, opening normals or normally closed contacts 234—235 and breaking the holding circuit for the systolic relay and the index coil $S_1$. Thus index pawl 212 drops back into a notch 219 and stops the disc 177.

Each succeeding systolic and diastolic pulsation sensed or detected by the cushion 125 and associated sensitive switch will cause a corresponding number of releases of the index disc 177 until a fixed time interval expires. This interval is selected as one-third of a minute, and there is a wiper switch arm 191 associated with the friction clutch drive of the index disc and which always moves from a starting position over an elongated contact 184, to close an operating circuit for index or clutch coil 200 via power conductor 72, wiper arm 191, elongated contact 184, conductor 247, systolic relay contacts 244—245, conductor 202 through the index clutch coil 200 ($S_1$) and back to the other side 151 of the power line. Thus, as long as wiper 191 rides on elongated contact 184, the index coil $S_1$ may be actuated by the systolic relay.

Motor drive means 160 is preferably of the synchronous variety including a clock gear drive arranged to cause wiper 191 to traverse the length of contact 184 in twenty seconds. Disc 177 (177Z in Fig. 11) carries an index pointer 252 (252Z Fig. 11) which moves relative to a fixed scale, not shown in Fig. 1, but indicated at 250Z in Fig. 11, which is calibrated to read in pulses per minute, each scalor graduation corresponding to one pulsation, whereas the index pointer 252Z moves at each step a distance equivalent to three graduations on the dial scale. Thus, since the actual testing time is only one-third of a minute (to avoid detaining the patron too long), the index pointer is arranged to move so as to express the actual reading for one-third of a minute in average terms of a whole minute.

When twenty seconds have elapsed wiper contact 191 disengages contact 184 making it impossible for the systolic relay to further actuate the clutch or index coil 200, but contact 191 continues to move until it engages a single button contact 254, which connects power from line 72 through wiper 191, button 254, conductor 266, conductor 264 to one terminal of the coil 206 of pressure relay Pr, whose remaining terminal connects with the other power lead 151, so that relay Pr pulls up and locks its own holding circuit through contacts 267—268 connecting power lead 72 to coil 206 via conductor 264. Power lead 72 is constantly connected to wiper 191 by engagement of a part of the latter with contact ring 191a connected as at 72a to lead 72.

Meanwhile, wiper 191 continues its movement until it is stopped upon starting contact 192 by means of a movable stop arm 196 which normally lies in the path of the wiper.

When wiper 191 passes over contact button 254 as aforesaid, not only is the pressure relay energized, but coil 256 of the electromagnetic valve 280 is also energized via conductor 259 connecting with conductor 266; and thus electromagnetic valve coil 256 is held energized via conductor 266 through closure of pressure relay contacts 267—268, so that the pressure line 272 is now closed and pump P' can now inflate the upper or pressume cushion 294.

When a pressure of about 200 mm. of mercury is reached, bellows 285 will close valve 286 owing to back pressure in conduit 291, which includes the pressure cushion 294 and a mercury manometer 302, the normally closed valve 299 for which is opened at the start of operation of the apparatus upon deposit of a coin, since coil 391 is connected to power leads 72 and 151. It may also be conveniently explained at this juncture, that the manometer valve solenoid 391 also controls a valve 400 connected via conduit 402 to the lower or wrist cushion pressure line 91. When solenoid 391 is deenergized, manometer valve 299 is closed but the valve 400 is open, and vice versa.

A pressure of 200 m. m. of mercury is found sufficient to collapse the radial artery in the average person who is in condition to patronize the machine, as pressures above this level are found for the most part only in persons who should already be under a physician's care. With the artery thus collapsed, there will be no pulsations sensed in the region at the wrist, and the mechanism is now ready to test for the relative blood pressure, that is to say the pressure exerted within the artery, against the tension thereof, and capable of balancing an extraneous pressure, such as applied by cushion 294, to the extent that the flow of blood may be resumed in the artery.

The apparatus is arranged so that the extraneous pressure applied to the forearm by cushion 294 as aforesaid, will be dropped step by step until the pulses are again detected at the lower cushion, indicating that the flow of blood in the artery has been resumed.

Such step by step reduction of extraneous or collapsing pressure is accomplished by a bleeder valve 307 which is periodically opened by a lever 317 oscillated by the connection shown with the reciprocating pump drive rod 82. Each time the bleeder valve opens it permits a short conduit 312 to fill to capacity; this conduit is normally closed against escape of such air by an escape valve 316, adapted to be momentarily opened by an electro-magnetic operating means including coil 328 and armature 329.

The escape valve coil 328 has one of its terminals connected to power conductor 72 via conductor 259—266 and pressure relay contacts 267—268, while the remaining terminal is connected via pump switch 335—338 and conductor 333 through an elongated contact 64 on step-up switch 60 to the remaining side 51 of the power line.

The pump switch 335—338 is normally open and is so arranged that during each cycle of oscillation of pump lever 317, while bleeder valve 307 is closed, this switch will be closed, energizing escape coil 328 to open valve 316 and permit the measured amount of air in the short length of conduit to escape. Obviously, the pressure in line 291 to the pressure cushion will be reduced by an amount equivalent to the capacity of short conduit 312 for each complete opening and closing of bleeder valve 307 and escape valve 316—that is to say, for each complete oscillation of lever 317.

In such a manner the pressure tending to prevent the flow of blood in the artery of the patron is reduced in steps of preferably two to four millimeters at a time until the blood flow is resumed, at which time, the pressure indicated by the height of the mercury column in the manometer will be a measure of the relative systolic blood pressure of the patron.

Between each reduction in pressure as aforesaid, test is made automatically to ascertain if there is any resumption of blood flow. So soon as the flow is resumed, the detecting switch contact 136 will begin to respond to fluctuations in the bellows 119, and the systolic and diastolic relays will operate as described in conjunction with the pulse rate test.

Each time the systolic relay S releases, contact 240 thereon engages contact 355 and completes circuit via conductor 356 to one terminal of a step-up advancing coil 352; the other terminal of this coil is connected via conductor 353 to contacts 351 and 341 on a cam switch 349 (actuated cyclically by timer motor 160) and thence via conductor 342 through (normally open) contacts 207—343 on the pressure relay Pr via conductor 208 to the remaining power line 72 through starting button 192 on the timer switch, it being recalled that coil 206 of relay Pr remains energized as long as contact 191 rests on button 254, so that contacts 207—343 are closed at this time.

Thus, if systolic relay releases at a time when cam switch 341—351 is closed, stepping coil 352 will be energized and move contact 61 one step (anti-clockwise) toward the upper end of long contact 63, contacts 61 and 62 being fixed to move with the ratchet shown, which is stepped by the armature of coil 352 in the manner well known in the art.

It will be observed that there are four notches on the switch cam 349, and contacts 341—351 are closed in alternation with contacts 341—340, contact 340 connecting power via conductor 339 to one terminal of reset coil 56 for the stepping switch to energize said reset coil. Stepping switch 60 is of a conventional nature and need not therefore be described in detail. In this type of switch the contacts such as wiper 61 are returned to a zero or starting position by a spring 366 which is tensioned by advancing movement of the wiper contact under urgence of coil 352. Pawl 357 prevents retrograde movement of the ratchet disc and wiper; but the pawl may be withdrawn by energization of coil 56.

While the pressure is being reduced as aforesaid, the mercury column (303Z, Fig. 11) will be dropping step by step, and wiper contact 61 will be alternately advanced and reset by action of cam switch 349—provided, however, that no systolic pulses occur while cam switch contacts 341—351 are closed.

So soon as the pressure becomes sufficiently reduced to permit systolic pulses to be picked up at the wrist cushion, systolic relay 232 will pull up and should five successive systolic pulses occur in the interval elapsing while cam contacts 341—351 are closed, stepping switch wiper 62 would clear elongated contact 64, breaking the power circuit via conductor 333 to the bleeder or air escape coil 328; moreover, wiper 61 would be advanced clear of contact 63 and the power circuit would be broken, stopping the machine. Under these circumstances, valve 299 would close, retaining the pressure in branch 300 of the manometer to hold the pressure reading. Valve 400 would open, relieving pressure from reservoir 95, while valve 280 would open to relieve pressure line 291.

The form of the apparatus thus far described is operable to register the pulse and systolic blood pressure of a user of the apparatus but in Figs. 2 to 10, inclusive, we have shown a form of the apparatus which is operable to record the pulse and systolic blood pressure ascertained by the apparatus which has been described hereinabove, and in this connection it is to be noted that those parts in the form of the apparatus shown in Figs. 2 to 10, inclusive, which correspond to parts included in the apparatus as hereinabove described are indicated by the same reference characters hereinabove employed but the suffix $x$ is added thereto where such reference characters appear in said Figs. 2 to 10.

Thus as hereinbefore described a bracket 169$x$ (Fig. 2) is supported by the casing 30$x$ and extends parallel to the panel 34$x$ in spaced relation therewith to accommodate the index disc 177$x$ and the plate 182$x$ and associated parts, this bracket serving as the support for the timing motor 160$x$ and the devices which cooperate therewith. Furthermore, an armature 212$x$ is provided that is equipped with an ear which is adapted to seat in the notches 219$x$ provided in the periphery of the disc 177$x$, such ear seating in a notch 219$x$ to retain the disc 177$x$ in advanced position representative of the pulse of a user of the apparatus when said disc 177x is moved into such advanced position in the manner hereinabove described.

While, as in the case of the disc index 177, the disc 177x may be equipped with an indicating means such as the pointer 252 adapted to register with a scale as 251, the disc 177x in any event is equipped with type as 425 selectively movable into association with the platen 426. This arrangement is such that the particular set of type aligned with the platen 426 when the disc 177x is moved into an advanced position representative of the pulse of a user of the apparatus will print the pulse in terms of beats per minute when the platen 426 functions to effect a printing operation and the manner in which this is effected will now be described.

A brace 427 (Fig. 2) extends between the bracket 169x and a side wall of the casing 30x and supports a bracket 428 on which an electromagnet 429 is mounted. An arm 430 (Fig. 3, also) projects from the bracket 428 and the armature 431 of the electromagnet 429 is pivotally mounted thereon as indicated at 432, a spring 433 extending between the bracket 428 and the armature 431 and being effective to urge the armature 431 away from the core of the electromagnet 429 when this electromagnet is deenergized. A leaf spring 434 projects from the end of the armature 431 opposite that connected to the spring 433 and the platen 426 is mounted at the free end of this leaf spring. An ink ribbon IR is led about suitable guides as 435 and 436, Fig. 2, to extend across the face of the type 425 aligned with the platen 426 and is wound on spools S which have suitable means associated therewith for advancing the ribbon IR step by step; such ribbon advancing means are common in the art and are not, therefore, described in detail herein. It will be understood that the ribbon advancing means will derive power from some movable part in the apparatus which will cause the ribbon to be advanced in a step by step manner intermediate impression operations of the platen 426.

A web guide 437 is supported from the casing 30x and the bracket 169x by braces 438 and 439, Fig. 2, and has a slot 440 (Fig. 4) therein through which the web W is led from suitable web advancing means described in detail hereinafter, the free end of the web W being led past and between the ink ribbon IR and the platen 426 and being extended into the upper end of a ticket discharge chute 441 (Figs. 3 and 4) adapted to lead to an opening at the front of the machine (not shown) and through which a ticket T, Figs. 8 and 9, severed from the web W in a manner explained presently may be removed.

As best shown in Figs. 4 and 7, a finger 443 projects from the lower end of the web guide 437 and is formed to extend across the edge and then behind the disc 177x, intermediate such disc and the panel 34x, and a pad 444 preferably of sound-deadening material is provided on the finger 443 in alignment with the platen 426 and bears on the disc 177x, this arrangement affording an anvil for the platen 426 in an impression operation. As will be explained in further detail hereinafter, when the machine is initially set in operation the electromagnet 429 is energized and therefore the armature 431 thereof is attracted against the effect of the spring 433. As an incident to the completion of an operation of the machine, circuit to the electro-magnet 429 is broken and therupon the armature 431 is freed to the effect of the spring 443 and consequently the platen 426 is forcibly urged toward the pass of the web W lying between this platen and the ink ribbon IR and the web is therefore forced against the ink ribbon IR which, in turn, is forced against the type 425 aligned with the ink ribbon IR and therefore the platen 426 and an impression is made from such type 425 through the ink ribbon IR onto the web W.

The platen 426 is snapped against the web W to effect the aforesaid impression by reason of the engagement of the leaf spring 434 with the pin 445 during the movement of the armature 431 under the influence of the spring 433, the pin 445 being carried by an upstanding finger on the bracket 439 and being disposed to engage the leaf spring 434 just prior to the time the platen 426 engages the web W as the armature 431 is being moved under the influence of the spring 433.

In the present instance movement of the armature 431 under the influence of the spring 433 is limited by engagement thereof by the upper end of the ticket discharge chute 441 and after the arrmature has come to rest in this position and the platen 426 has made an impression as above described, the platen springs back out of disengagement with the web W and out of the path of advance of this web wherefore, in a manner that will be explained presently, after a ticket is severed from the web, the web may be advanced past the platen 426 to and into the upper flared end of the ticket discharge chute 441.

It has been explained hereinabove that, as an incident to the completion of an operation of the present apparatus for ascertaining the systolic blood pressure, the valve 299, Fig. 1, closes and therefore whatever pressure has been established in the tube 300 is maintained therein. It has also been explained that whatever pressure is then maintained in the tube 300 is equal to the systolic blood pressure of a user of the apparatus. Hence by setting up recording means under control of the pressure in the tube 300 a record may be afforded of the systolic blood pressure of a user of the apparatus and therefore, in the present instance a tube 446, Fig. 1, leads from the tube 300 to a bellows 447, Figs. 2 and 3, that is similar to the bellows described hereinabove, the bellows 447 being supported by a bracket 449 carried by the housing 450, described in full detail hereinafter, which is carried by the braces 438 and 439. The bellows 447 and the housing therefor are part of a recording apparatus, operable to print the systolic blood pressure in terms of millimeters of mercury in the present instance, and which will now be described.

A bar 451 leads through an opening in the bracket 449 into the bellows 448 and is connected to the head of such bellows, this bar having a rack 452 formed thereon adjacent the end thereof opposite that connected to the bellows 448. The rack 452 meshes with a pinion 453 fast on a shaft 454 journaled in a bearing 455 provided at the lower end of the bracket 449, a guide 456 projecting from the bracket 449 and engaging the bar 451 so as to retain the rack 452 thereon in mesh with the pinion 453. A drum 457 is fast to the shaft 454 at the end thereof opposite that at which the pinion 453 is fast and this drum has sets of type 458, Fig. 3, provided on the periphery thereof that are adapted to be selectively moved into alignment with the platen 459 described more fully hereinafter.

The sets of type 458 are selectively moved into alignment with the platen 459 in the course of an operation that proceeds to ascertain the systolic blood pressure, and the arrangement is such that at the time, in the present form of the apparatus, the valve 299, Fig. 1, closes to thereby maintain whatever pressure has been established in the tube 300, the set of type aligned with the platen 459 will in the course of an impression operation effected by the platen 459 print on the web W the systolic blood pressure in terms of millimeters of mercury and the manner in which this is effected will now be described.

An electromagnet 460 is supported from the brace 427 by a bracket 461 on the arm 462 of which, in the manner indicated at 463, the armature 464 of the electromagnet 460 is pivotally mounted. As in the case of the electromagnet 429 the electromagnet 460 is energized at the initiation of an operation of the apparatus and is deenergized as an incident to the completion of an operation of the apparatus. When the electromagnet 460 is energized the armature 464 thereof is attracted against the effect of the spring 465 so as to thereby dispose the platen 459 in the position in which it is shown in Fig. 3 out of engagement with the web W.

The platen 459 is carried by a leaf spring 466 that projects from the armature 464 adjacent the connection of the spring 465 thereto, said spring 465 extending between said armature and a spring anchor provided on the arm 462. A pin 467 projects from the arm 462 to lie in the path of movement of the leaf spring 466 when the armature 464 is freed to the effect of the spring 465 upon deenergization of the electromagnet 460, the leaf spring 466 engaging the pin 467 in the course of such movement and causing the platen 459 to snap against the web W and thereby force this web toward the set of type 425 aligned with the platen 459. An ink ribbon IR' wound on spools S' corresponding to and advanceable in the manner similar to the spools S is interposed between the web and the type 458 aligned with the platen 459. Thus when the platen 459 snaps against the web W an impression is made on the web that expresses the systolic blood pressure in terms of millimeters of mercury.

It will be noted that the platen 426 is disposed on one side of the pass of the web W between the web guide 437 and the ticket discharge chute 441 while the platen 459 is mounted on the other side of such pass of the web, it being this pass of the web that is to afford the ticket T, Figs. 8 and 9. Furthermore, the platen 426 is aligned with the upper portion of such pass of the web while the platen 459 is aligned with the lower portion of such pass of the web. Thus when this pass of the web is severed therefrom to afford the ticket T and the ticket passes through the discharge chute 441 to be discharged from the machine, the ticket will have the pulse of the user of the apparatus printed on one face thereof and the systolic blood pressure of such user printed on the other face thereof, such opposite faces of the ticket T being respectively shown in Figs. 8 and 9. The type drum 457 is moved circumferentially into relative positions corresponding to the systolic pressure reading afforded by the monometer, while the type disc 177x is moved circumferentially in positions corresponding to the pulse rate, established by any given individual patronizing the machine. Thus it will be apparent that, after the impressions of the pulse and blood pressure have been made on the aforesaid pass of the web W, such pass of the web should be severed from the web to afford the ticket T and thereafter the web should be advanced to extend the free end thereof into the ticket discharge chute 441 so that another ticket may be severed therefrom in a succeeding operation of the apparatus and the manner in which this is effected will now be described.

The frame 450, to which reference has been made hereinabove, includes side plates 468 and 469 (Fig. 4) that are respectively carried by the braces 438 and 439. A bracket 470 is mounted on the side plate 468 inwardly of the frame 450 and supports an electromagnet 471, the armature 472 of which is afforded by a cross brace between the arms 473 and 474 pivotally mounted adjacent the inner faces of the side plates 468 and 469 on a rod 475 extended between and carried by said plates, a spring 476 being effective on the arm 473 to hold the armature 472 away from the core of the electromagnet 471 so long as said electromagnet is deenergized. A knife 477 is mounted at the lower ends of the arms 473 and 474 to be movable across the suitable formed lower end of the web guide 437, said knife including a substantially V-shaped shearing edge 478, Fig. 7. The spring 476 is effective to maintain the knife 477 out of association with the web W so long as the electromagnet 471 is deenergized but when said electromagnet is energized in a manner to be explained presently the knife 477 is swung across the lower formed end of the web guide 437 and thereupon the pass of the web between this guide and the ticket discharge chute 441 is severed from the main extent of the web to afford a ticket T which is thereupon discharged through the ticket discharge chute 441.

The web W is withdrawn from a roll R of a strip of suitable paper, the roll being mounted on a spindle 479 that extends between and is carried by the side plates 468 and 469 adjacent the upper edges thereof, as best shown in Figs. 3 and 4. The web is withdrawn from the roll R and passed over the feed roller 480 and through the bite between this feed roller and the clamping roller 481.

The feed roller 480 is rotatably mounted on a shaft 482 that extends between and is carried by the side plates 468 and 469. A pinion 483 is rotatably mounted on the shaft 482 at one end of the roller 480 and a ratchet wheel 484 is fast to said roller at the other end thereof. A finger 485 is provided at the upper end of the arm 473 and has one edge thereof formed to afford a gear segment 486 that meshes with the pinion 483. The pinion 483, like the roller 480, is rotatable on the shaft 482 and connection between this pinion and the roller is established through the pawl 487 pivotally mounted, as indicated at 488, on the end of the roller 480 adjacent the pinion 483, a leaf spring 489 on this end of the roller 480 being effective to urge the pawl 487 into engagement with the teeth of the pinion 483. The ratchet 484 that is fast to the roller 480 is engaged by a pawl 490 pivotally mounted as indicated at 491 on the inner face of the side plate 469, a leaf spring 492 carried by the pin 493 and engaged by the pin 494 being effective to retain the pawl 490 in engagement with the teeth of the ratchet 484, the pins 493 and 494 being carried by the side plate 469.

The foregoing arrangement is such that when the electromagnet 471 is energized the arm 473 moves clockwise as viewed in Fig. 4 and counterclockwise as viewed in Fig. 5, and in the course of the consequent rotation of the pinion the teeth thereof freely ride past the pawl 487. While the pinion 480 is so rotating, the retaining pawl 490 is effective on the teeth of the ratchet 484 to hold the roller 480 against rotation. When, however, the electromagnet 471 is deenergized the arm 473 is freed to the effect of the spring 476 and in this event the arm moves counterclockwise as viewed in Fig. 4 and clockwise as viewed in Fig. 5. In such circumstances the pawl 487 seats in a tooth of the pinion 483 and therefore the roller 480 is driven counterclockwise as viewed in Fig. 4 and in the course of such rotation of this roller the web W is advanced in an amount away from the web guide 437 sufficient to extend the free end thereof into the ticket discharge chute 441, this being effected by reason of the fact that the roller 481 tightly clamps the web W into engagement with the periphery of the feed roller 480 which may be roughtened or otherwise arranged to insure non-slipping engagement thereof with the web W.

The clamping roller 481 which is thus effective to clamp the web in engagement with the periphery of the feed roller 480 is mounted on a shaft 495 carried at the lower ends of arms 496 and 497, Fig. 2, that are respectively pivotally mounted on the inner faces of the side plates 468 and 469, as indicated at 498 and 499, Fig. 2. A spring 500 extends between the arm 496 and a spring anchor on the side plate 468 and is effective to urge and maintain the roller 481 in clamping relation with the roller 480 whereby when the web W is fed through the bite thus established between these rollers, feeding of the web in the above described manner is assured.

The web is fed in the above described manner in a predetermined amount and, therefore, prior to the time it is wound to afford the roll R, suitable indicia may be printed thereon at regularly spaced intervals, such indicia to be, for example, explanatory of the matter printed by operations of the platens 426 and 459. Thus, in the present instance, the word "Pulse" is printed on one face of the web W at positions spaced one from the other in an amount equal to the distance the web is fed by each operation of the feed roller 480 and an arrow is printed above each such word "Pulse" to point toward the place whereat an impression will be made by the platen 426 when this particular part of the web, where such arrow is located, is moved into alignment with such platen 426. Moreover, in the present instance the words "Blood pressure" are printed on the opposite face of the web in the aforesaid spaced relation and an arrow is printed below such words, at each place where they are printed, to point to the place whereat an impression will be made by the platen 459 when such portion of the web moves into alignment with this platen.

It has been explained that the electromagnets 429 and 460 are deenergized at the end of a cycle of operation so as to thereby bring about the impression operations hereinabove described. It will be understood that such impression operations must be completed prior to the time the knife 477 severs the web W to afford a ticket T and since such severing operation is effected upon energization of the electromagnet 471, it is manifest that the electromagnet 471 is not to be energized until after the completion of the aforesaid impression operations, such delaying of the energization of the electromagnet 471 also insuring that the web feeding operation will not take place until after a ticket has been printed and severed from the web, and in view of the foregoing, energization of the electromagnet 471 is effected in the manner now to be described.

When systolic and diastolic impulses are impressed on the bulb 125 in the course of an operation proceeding to ascertain the systolic blood pressure as aforesaid, the contact finger 62 on stepping switch 60 is retracted from engagement with the contact strip 64, thus disconnecting power from conductor 333 so that the air escapement or bleeder mechanism 316—328 cannot operate. If further retraction of the contact finger 62 accrues by reason of the fact that blood is again coursing through the radial artery that leads past the volar aspect of the wrist with which the bulb 125 is engaged, the contact finger 61 is subsequently retracted from engagement with the contact strip 63, disconnecting power from other parts of the circuit. The arrangement thus afforded is utilized to insure energization of the electromagnet 471 at a proper time in the operation of the machine.

Thus by referring to Fig. 10 it will be seen that a contact finger 62x is engaged with a contact strip 64x in the same manner as that in which the contact finger 62 is engaged with the contact strip 64 at the initiation of a cycle of operation of the machine, and further that the contact finger 62x is retractible into engagement with an additionally provided strip 370x in the course of retraction of the contact finger 62x along with the retraction of the contact finger 61x. Therefore, when, in the manner hereinabove described with respect to the contact finger 62 and the contact strips 64, the contact finger 62x is retracted from engagement with the contact finger 64x into engagement with the contact strip 370x, then circuit is closed from line wire 51x through conductor 65x, contact finger 62x and contact strip 370x to conductor 501 which leads to one end of the winding of a relay 502, a conductor 503 leading from the other end of this winding, to contact 504 of a relay 505 (which contact will at this time be engaged by the contact 506 of said relay 505) and circuit is continu d through to the line wire 50x through conductor 507. Thus when the contact finger 62x is retracted into engagement with the contact strip 370x, circuit is established through the winding of the relay 502 which thereupon becomes energized.

The just described circuit is established by reason of the fact that the contact finger 61x will at this time be in engagement with the contact strip 63x wherefore, through conductor 66x, circuit is established to terminal 67x, as hereinabove explained with reference to contact finger 61, contact strip 63, conductor 66 and terminal 67. Thus so long as contact finger 61x is in engagement with contact strip 63x, circuit is established as follows:

From line wire 51x through conductor 65x, contact finger 61x, contact strip 63x, conductor 66x, terminal 67x, and conductor 508 to one end of the winding of the relay 505, and from the other end of the winding of this relay through conductor 509 to line wire 50x.

Therefore, so long as contact finger 61x is in engagement with contact strip 63x, contact 506 is engaged with contact 504 and therefore when contact finger 62x engages contact strip 370x, circuit is established through the winding of relay 502 and thereupon the contact 510 of relay 502 engages the contact 511 thereof and in this event the following circuit is established.

From line wire 51x through conductor 512, contact 510, contact 511 and conductor 513 to one end of the winding of a solenoid 514 and through conductor 515 leading from the other end of the winding of this solenoid to line wire 50x. Thus engagement of the contact 510 with the contact 511 upon the energization of the relay 502 when the contact finger 62x is retracted into engagement with the contact strip 370x energizes the solenoid 514 which thereupon attracts the core 516 thereof downwardly, as viewed in Figs. 2 and 10.

By referring to Fig. 2 it will be seen that a piston 517 is provided at the lower end of the core 516 of the solenoid 514 and that a valve leather 518 is carried by this piston to be engageable with the wall of the cylinder 519, a restricted port 520 being provided in the cylinder 519 and a spring 521 being provided in this cylinder to be effective on the piston 517 and core 516 to urge the same upwardly as viewed in Fig. 2. The solenoid 514 and the cylinder 519 are carried by a bracket 522 supported from the bracket 169x. It will be understood that the piston 517, valve leather 518 and the cylinder 519, with its restricted port 520, affords a dash pot, the effect of which is that when the solenoid 514 is energized the core 516 thereof moves downwardly slowly under control of the dash pot so provided. This arrangement affords a time delay which suppresses energization of the electromagnet 471 for the desired time interval, above explained. When, however, after the elapse of a predetermined time, the solenoid 516 attains substantially the end of its downward travel the contact 523, on the arm of insulating material 524 mounted at the upper end of the core 516, engages the spring contact 525 carried by a block of insulating material 526 supported on the bracket 522 and the following circuit is established.

From line wire 51x through conductor 527, one end of the winding of the electromagnet 471 and thence through conductor 528 (which leads from the other end of the winding of this solenoid and which is preferably coiled so as to be extendible upon movement of the core 516), contact 523 that will then be engaged with contact 525, and from contact 525 through conductor 529 to line wire 50x and thereupon the electromagnet 471 becomes energized.

It has been explained hereinabove that the solenoid 471 is not to be energized until after the deenergization of the electromagnets 429 and 460 and it has also been explained that such electromagnets are to be deenergized as an incident to the end of a cycle of operation of the machine. Hence, circuit to the electromagnets 429 and 460 is established through contact finger 61x and the contact strip 63x, which contact finger engages such contact strip as an incident to the initiation of an operation of the machine as has been explained hereinabove with reference to the contact finger 61 and the contact strip 63.

Thus, when the contact finger 61x moves into engagement with the contact strip 63x at the initiation of a cycle of operation of the machine, circuit is closed from the line wire 51x through conductor 65x, contact finger 61x, contact strip 63x, conductor 66x, terminal 67x, conductor 530 to terminal 531 and thence through conductor 532 that leads to one end of the winding of the electromagnet 460 and from the other end of this winding through conductor 533 to terminal 534 and thence through conductor 535 to line wire 50x whereupon the electromagnet 460 is energized. Circuit at this same time is extended from terminal 531 and conductor 536, to one end of the winding of the electromagnet 429 and from the other end of this winding through conductor 437 to terminal 534 and hence electromagnet 429 becomes energized simultaneously with electromagnet 460.

As has been explained with reference to the analogous functions of contact fingers 61 and 62 and contact strips 63, 64, the contact finger 62x is retracted from engagement with the contact strip 64x into engagement with the contact strip 370x prior to the time the contact finger 61x is retracted from engagement with the contact strip 63x to stop the entire machine. Thus at the time circuit is established to the relay 502 by reason of the engagement of the contact finger 62x with the contact strip 370, the contact finger 61x will still be in engagement with the contact strip 63x. Such closing of circuit to the relay 502 will result in energization of this relay wherefore the contact 510 is engaged with the contact 511 and circuit is therefore closed to the solenoid 514 and thereupon the core 516 of this solenoid starts to move downwardly to advance the contact 523 toward the contact 525. The dash pot associated with the core 516, however, interposes such a time interval that the contact 523 will not engage the contact 525 until after the contact finger 61x has disengaged the contact strip 63x with the effect of interrupting a cycle of operation of the machine as hereinabove explained with reference to the disengagement of the contact finger 61 from the contact strip 63. Thus circuit is not closed to the electromagnet 471 until after circuit is broken to the electromagnets 429 and 460, which occurs upon disengagement of the contact finger 61x from the contact strip 63x. The delay thus afforded in the energization of the electromagnet 471 is of sufficient duration to prevent energization of the electromagnet 471 prior to the time the hereinabove described printing operations have been effected and thus severance of a ticket T from the web W is delayed until after the impressions have been made on that part of the web W that is to afford the ticket T.

It is essential that the contact 523 remain in engagement with the contact 525 to establish and maintain circuit to the electromagnet 471 for a period of time sufficient to insure effecting of the functions brought about by such electromagnet and it will therefore be manifest that circuit to the relay 502 must be maintained after the contact finger 61x disengages the contact strip 63x for otherwise contacts 510 and 511 would be disengaged and circuit to the solenoid 514 and therefore electromagnet 471 would be broken when contact finger 61x disengages contact strip 63. To this end the relay 505 is a slow-to-release relay and consequently contacts 504 and 506 thereof do not separate instantly when circuit is broken to this relay. Thus circuit is established to the relay 502 upon engagement of the contact finger 62x with the contact strip 370x and by referring to Fig. 10 it will be seen that when the contact fingers 61x and 62x attain their normal at-rest positions, (similar to the normal at-rest positions of the contact fingers 61 and 62 shown in broken lines in Fig. 1) the contact finger 62x will be in engagement with the contact strip 370x and thus, in so far as this control of circuit to the relay 502 is concerned, the circuit will be established.

However, circuit to the relay 502 is also established through the contacts 504 and 506 of the relay 505 and circuit to this relay is broken when the contact finger 61x disengages the contact strip 63x. But since the relay 505 is a slow-to-release relay, the contact 506 thereof does not disengage the contact 504 thereof until the lapse of the release time of this slow-to-release relay, and this lapse of time is sufficiently prolonged to maintain the relay 502 and therefore the solenoid 514 energized for a period of time sufficient to enable the aforesaid printing operations to be effected and also sufficient time to enable severing of the ticket T from the web W. Such release time of the relay 505 should also be sufficiently restricted so that after the ticket T has been severed from the web W, circuit to the relay 502 and consequently the solenoid 514 will be broken, wherefore the contact 523 may disengage the contact 525 and bring about deenergization of the electromagnet 471 to enable advancing of the web in a manner above described. It is, of course, advantageous to include in the release time of the relay 505 a safety factor sufficient to insure that the aforesaid printing operations and severing of the web will always occur.

There may be instances where the contact finger 62 will be retracted from engagement with the contact strip 64 and then the contact finger 62 will be advanced back into engagement with the contact strip 64 without the contact finger 61 having disengaged the contact strip 63 (as where the necessary number of systolic pulses do not occur during operation of cam switch means 341—349—351, etc.). In event this should occur in the present form of the apparatus, the retraction of the contact finger 62x into engagement with the contact strip 370x will bring about energization of the relay 502 with the consequent energization of the solenoid 514 and thereupon the core 516 of this solenoid will start to move downwardly. However, if the contact finger 62x is then advanced back into engagement with the contact strip 64x and out of engagement with the contact strip 370x, (as by resetting operation of coil 56 for lack of necessary systolic pulses) circuit will be broken to the relay 502 and thereupon the contact 510 will disengage the contact 511 thereof and thus circuit will be broken to the solenoid 514.

In this event the spring 521 will be effective on the core 516 to return it to its normal upper at rest position. Hence, when the contact finger 62x is again retracted back into engagement with the contact strip 370x, the full hereinabove described time delay will be interposed, it being understood that the spring 521 quickly returns the core 516 to its upper position since the dash pot associated with this core only resists downward movement thereof.

The just described disengagement of the contact finger 62x from the contact strip 370x has no effect upon the operation of the slow-to-release relay 505, for the time delay afforded by the release time of this relay only arises when circuit to this relay is broken, and this does not occur unless the contact finger 61x is retracted from engagement with the contact strip 63x and whenever this occurs there will be no return of the contact finger 62x into engagement with the contact strip 64x until a succeeding cycle of operation of the machine ensues.

Galvanometric indicator

An additional indicating arrangement advantageously utilized in the present invention is shown in Figs. 11 to 19, inclusive, and those parts there shown which correspond to parts included in the apparatus hereinabove described are indicated by the same reference characters hereinabove employed but the suffix z is added to such reference characters where they appear in Figs. 11 to 19 inclusive.

One aspect of the arrangement shown in Figs. 11 to 19, inclusive, is similar to the form of the apparatus last described, which is to say, the arrangement is such that visual indication is afforded of the force and magnitude of systolic and resultantly diastolic effects sensed in accordance with the operation of the apparatus, and to this end a sight opening 564 is provided in the panel 34z behind which the face of a galvanometer 565 is disposed, said galvanometer being supported in such position through the intermediary of a brace or bracket (not seen) behind panel 34z. The galvanometer 565 includes a needle or pointer 566 which normally registers with zero position on a scale 567 etched or otherwise formed in the face of the panel 34z and which may be included on the face of the galvanometer 565 to be visible through the sight opening 564.

Referring to Fig. 12, a bellows is associated with a pin as 135z which is reciprocated in response to systolic and resultantly diastolic effects sensed at the volar aspect of the wrist of a user of the apparatus; in the present instance, a bellows 561z is supported in position as by bracket 560z to be compressed and expanded by reciprocations of pin 135z. A tube 563z is led to a housing 568 (Fig. 14) suitably supported within the casing 33z, and in this instance the arrangement including the bellows 561z, tube 563z and housing 568 is preferably arranged to be airtight so that as an incident to compressions and subsequent expansions of the bellows 561z, pressure will be varied in the housing 568.

In the present instance a transduction means such as a crystal microphone 569 is mounted in the housing 568 and this microphone is responsive to variations in pressure induced in this housing in the manner above described. It is to be understood, however, that in some instances it will not be necessary to provide an additional bellows as 561z, for the crystal microphone might be arranged to be directly associated with the bellows in the bellows housing 119z (Fig. 12) but inasmuch as an arrangement utilizing a bellows as 561z in effect affords amplification of movements of a pin as 135z it is desirable to resort to the use of a housing as 568. As an incident to the sensing of a systolic effect and, consequently, movement of the pin as 135z, as hereinabove described, pressure is increased in the housing 568 and pressure is decreased in this housing upon sensing of a diastolic effect.

Pin 135z also operates the switch arm 136z, which is the same mechanically and electrically as switch arm 136 of Fig. 1; and as heretofore stated in connection with the description of Fig. 1, the switch arm 136z of Fig. 12 rests loosely upon the pin 135z so as to be frictionally carried back and forth thereby, arm 136z being loosely supported at one end on screw 139z to permit such motion, and being adapted thereby to move back and forth relative to contacts 141z, 146z, in the same manner and for the same purposes that arm 136 moves relative to contacts 143, 144 of Fig. 1.

The device of Fig. 12 is substituted in the arrangement of Fig. 1 by removing bellows 119 and substituting bellows 119z, connecting tube 116z, in place of tube 116, to nipple 117z, tube 123z being connected with the bellows housing at the nipple 122z to replace tube 123 of Fig. 1, thereby connecting bellows 119z for operation with pulse cushion 125. In this substituted arrangement, tube 563z is connected with chamber 568, as explained elsewhere.

Such variations in pressure in the housing 568 as are effected through operation of bellows 561z, are effective on the crystal microphone 569 to produce a piezo-electric effect, which is to say, to produce minute voltages that vary in accordance with the variations of pressure in housing 568, and hence with the variations in pulse cushion 125. It will be understood that the crystal microphone comprises a housing containing a crystal such as generally indicated at 569 in Fig. 14 or specifically identified at 570 in the schematic representation in Fig. 13, which is preferably of Rochelle salt or other suitable material having the desirable piezo-electric characteristics. The crystal microphone 569, in the present instance, is connected in an amplifying circuit as by having the plate 571 of the crystal 570 connected by a conductor 572 to the control grid 573 of an electron tube 574 which is preferably of the pentode type. The other plate 575 of the crystal 570 is connected by a conductor 576 to a terminal 577.

A conductor 578 leads from terminal 577 to a terminal 579 and a resistor 580 is connected between this terminal 579 and a terminal 581. A condenser 582 is connected in parallel with the resistor 580 by being included in a conductor 583 that leads between the terminals 577 and 581. The resistor 580 and condenser 582 together comprise a biasing impedance for the control grid 573 of the tube 574, the cathode 584 of this tube being connected by a conductor 585 to the terminal 581. The suppressor grid 592 of the tube 574 is connected to the cathode 584 by a suitable jumper 593. The screen grid 613 of the tube 574 is connected by a conductor 614 to the terminal 610.

In the present instance the filament 586 of the tube 574 is connected by conductors 587 and 588 to the secondary of a transformer generally indicated by 589, the primary of which transformer is connected by conductors 590 and 591 to the terminals 67 and 71, Fig. 1, so that the filament 586 is heated so long as the apparatus is in operation.

The plate 594 of the tube 574 is connected by a conductor 595 to one end of a load resistor 596, the other end of this resistor being connected to one terminal 597 of the galvanometer 565 by a conductor 598. The other terminal 599 of the galvanometer 565 is connected by a conductor 600 to a terminal 601, and the positive side of a battery 602 is connected by a conductor 603 to terminal 601. The negative side of the battery 602 is connected by a conductor 604 to a terminal 605 and a conductor 606 leads from terminal 605 to the aforesaid terminal 579. A conductor 607 leads from the terminal 601 to one end of a resistor 608 and the other end of this resistor is connected by a conductor 609 to a terminal 610. The condenser 611 is connected in parallel with the resistor 608 and the battery 602 by being included in a conductor 612 that extends between the terminals 605 and 610.

Upon the sensing of a systolic effect with the attendant increase of pressure in the housing 568, pressure on the crystal 570 of the crystal microphone 569 is increased and thereupon an increased positive potential is superimposed on the normal negative bias on the control grid 573, because of the piezo-electric voltage resulting from the compression of the crystal 570. Current flow between the cathode 584 of tube 574 and the plate 594 of this tube is thereby increased and this results in causing the needle 566 of the galvanometer 565 to be moved away from the normal zero position thereof in a positive direction, it being understood that, when an equalized pressure is established in the housing 568, the pointer of the galvanometer 565 registers with zero on the scale 567 and that it may move in a positive direction in the manner just explained upon increase in pressure in the housing 568 as, for example in response to systolic pulses.

Upon the sensing of a diastolic effect with a resultant decrease in pressure in the housing 568 from the momentarily elevated pressure during a systole, the piezo-electric voltage produced in the crystal 570 decreases toward normal value and therefore there is a decrease in the positive potential theretofore superimposed on the negative bias on the control grid 573 of the tube 574, and this in turn decreases the current flow in the plate circuit of the tube 574 toward its "normal" value, which circuit includes the winding of the galvanometer 565, wherefore in response to the restorative decrease in pressure in the housing 568 the pointer 566 moves in a negative direction back toward zero position on the scale 567.

It will therefore be seen that in response to systolic and diastolic effects with consequent compression and expansion of the bellows 561z, the pointer or needle 566 of the galvanometer 565 oscillates and it will be understood that the degree of such oscillation will be in direct response to the force and magnitude of the systolic and resultantly of the diastolic effects sensed. Thus in the instance of slight systolic and resultantly diastolic effects the pointer 566 will oscillate but slightly relative to the zero position thereof, but in those instances where the force and magnitude of systolic effects and resultantly diastolic effects is relatively great, such movement of the pointer or needle 566 will also be relatively great.

*Cardiograph unit*

It will therefore be seen that the form of the apparatus shown in Figs. 11 to 19, inclusive, also affords a visual indication of the force and magnitude of systolic and resultantly diastolic effects sensed by the apparatus, but the form of the apparatus illustrated in Figs. 11 to 19, inclusive, has further utility in that this form of the apparatus may be utilized to produce a form of cardiogram or graphic illustration of the pulse that is sensed by cushion or bulb means as 125, and to this end, apparatus constituting a second translating means or cardiograph unit is arranged in the manner now to be described.

Figure 19:
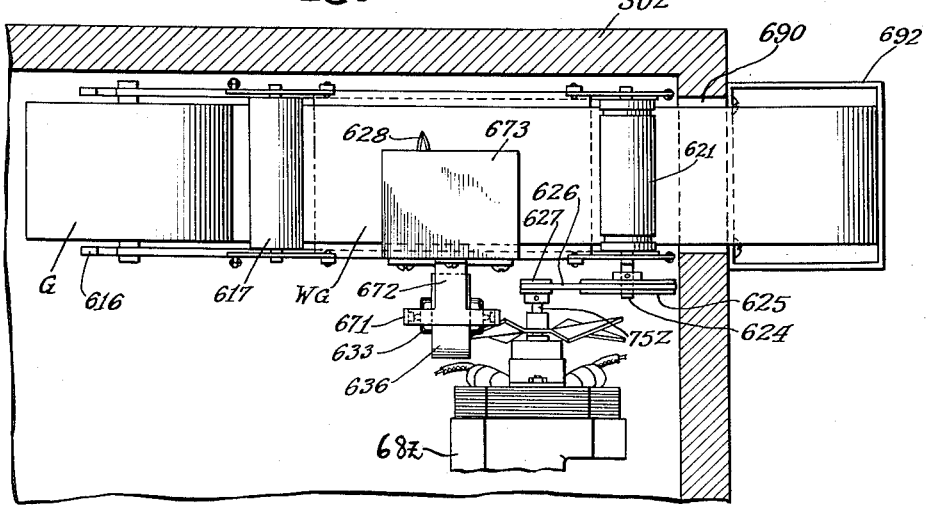
Fig. 19 is a top plan view of the cardiograph unit.

Referring to Figs. 16, 18, and 19, particularly, a frame 615 is provided which is suitably supported within the casing 33z preferably adjacent one side wall thereof and a bracket 616 is carried by this frame to afford a support for a roll of graph paper G from which a web WG is withdrawn and led between a pair of clamping rollers 617 and 618 suitably supported on the frame 615 and urged into clamping relation through the intermediary of springs as 619. A platen 620 is provided on the frame 615 and the web WG is led from the clamping rollers 617 and 618 across the face of the platen 620 and then through the bite between the clamping roller 621 and the feed roller 622 suitably supported on the frame 615, the clamping roller 621 being urged toward the periphery of the feed roller 622 through the intermediary of springs as 623.

The feed roller 622 is mounted on a shaft 624 on which a pulley 625 is fast, an endless belt 626 being passed about the pulley 625 and about the pulley 627 fast on the shaft 75z of the pump motor 68z which, of course, corresponds to the pump motor 68 hereinabove described and which, as has been explained, is set in operation at the time the machine is initially set in operation. Thus when the machine is initially set in operation, the web WG is fed across the face of the platen 620 and in the course of such advancing of the web WG the pen 628 will be rendered operative to thereby produce a graphic representation of the sensed pulse on the web WG, such pulse being sensed at the volar aspect of the left wrist of the user of the apparatus by the bulb 125. To this end the pen 628 is operated in response to systolic and diastolic effects impressed on the crystal microphone 569 and this is brought about in the following manner.

By referring to Figs. 13 and 15 it will be seen that a terminal 629 is included in the conductor 595 and that a conductor 630 is connected to this terminal. Another terminal 631 is included in the conductor 604 and a conductor 632 is led from this terminal. It will be understood that the circuit shown in Fig. 13 and which repeated in Fig. 15, in effect, constitutes a first stage of amplification and that the part of the circuit appearing to the right in Fig. 15 and to which the conductors 630 and 632 are led constitutes a last or final stage of amplification but in this regard it is to be understood that intermediate stages of amplification could be provided between those shown in Fig. 15, depending upon the power required to operate the pen 628. It will be understood that the galvanometer 565 could be included in the circuit as shown in Fig. 15, for the same purpose and in the manner hereinabove explained, primarily because the resistance of the winding thereof is negligible.

In the present instance the pen 628 is operated under the control of a D'Arsonval type of instrument which includes a movable coil 633 rotatably mounted between the poles 634 and 635 of a permanent magnet, generally indicated by 636, these parts being supported in a manner explained more fully hereinafter. The coil 633 is represented schematically in Fig. 15 where it is included in the plate circuit of the final stage of amplification as follows:

A conductor 637 leads from the plate 638 of the tube 639 in the final stage of amplification to one end of the protective resistor 640, the other end of which is connected by a conductor 641 to one end of the movable coil 633, the other end of such coil being connected by a conductor 642 to terminal 643. The positive side of a battery 644 is connected by a conductor 645 to the terminal 643 and the negative side of this battery is connected by a conductor 646 to a terminal 647 and thence by a conductor 648 to a terminal 649 which is connected by a conductor 650 to one end of the grid biasing resistor 651. The other end of the grid biasing resistor 651 is connected by a conductor 652 to the cathode 653 of the tube 639. A condenser 662 is connected in parallel with the resistor 651 by being included in a conductor 663 that extends between the terminals 664 and 665, the terminal 665 being included in the conductor 652, and the terminal 664 being connected to the terminal 649 by a conductor 666.

The coupling between the first and last stages of amplification in the present instance is afforded in the manner now to be described, and it will be understood that if additional and intermediate stages of amplification were utilized similar coupling would be afforded intermediate thereof. In the present instance the coupling between the first and last stages of amplification is of the resistance type, however, omitting the blocking condenser which is normally employed because of the fact that the frequencies which are measured are of low value.

Therefore the conductor 630 which is tapped to the conductor 595 in the plate circuit in the first stage of amplification leads to a terminal 654, which terminal is connected by a conductor 655 to one end of a coupling resistor 656. The other end of the resistor 656 is connected by a conductor 657 to a terminal 658 included in the conductor 632 which is connected to the terminal 631 that in turn leads to the negative side of the battery 602 in the plate circuit in the first stage of amplification. A conductor 659 connects the terminal 654 to the control grid 660 of the tube 639 in the final stage of amplification, it being understood that if intermediate stages of amplification were employed, the conductor 659 would lead to the control grid of the tube in the next stage of amplification. A conductor 661 connects the terminal 658 to the terminal 664 which is included in the plate circuit of the last stage of amplification in this instance, but it will be understood that if intermediate stages of amplification were employed the conductor 661 would connect to a terminal as 664 in the plate circuit of the tube in the next stage of amplification.

Filament 586 of tube 574 is connected by the filament voltage supply conductors 587 and 588 to the secondary of the transformer 589. The filament 695 of the tube 639 is connected by the conductors 593 and 594 to the conductors 587 and 588 so as to be in parallel with the filament 586 of tube 574, and if intermediate stages of amplification are employed, the filaments of the various tubes are likewise connected in parallel with the filament 586 to the secondary of transformer 589.

When pressure is increased in the housing 568 in response to the sensing of a systolic effect, the resulting increase in pressure is effective on the crystal microphone 569 to produce an increased piezo-electric voltage across the plates 571 and 575 of the crystal 570 with the effect of decreasing the negative bias on the control grid 573 of the tube 574, and this increases the current flow in the plate circuit of the tube 574. In the present instance such increase of the current in the plate circuit of the tube 574 is amplified by the tube 639 in the final stage of amplification with the result that there is a perceptible increase in the current flowing in the plate circuit of the tube 639 and therefore in the coil 633, Figs. 15 and 16. It will be understood that if intermediate stages of amplification are employed the increase in such current flow would be further amplified, the degree of increasing being proportionate to the magnitude of the amplification which, of course, will be dependent upon the number of intermediate stages of amplification employed.

When there is such an increase in the current flowing through the movable coil 633, said coil will rotate clockwise, as viewed in Fig. 16, with an effect to be described presently. Upon the sensing of the diastolic effect attendant to the systolic effect bringing about such movement of the coil 633 and the attendant decrease of pressure in the housing 568, there will be a decrease in the pressure effective on the crystal 570 in the crystal microphone 569 and in this instance there will be a decrease in the current flow through the coil 633, and this will cause the coil to rotate counterclockwise, as viewed in Fig. 16. It is such movement of the coil 633, either clockwise or counterclockwise as viewed in Fig. 16, that is effective to move the pen 628 relative to the web WG, and this is brought about in the following manner:

By referring to Figs. 16 and 18, it will be seen that studs 667 and 668 are provided on the coil 633 and these studs are journaled in jewel bearings 669 and 670 on the frame 671, this arrangement assuring free rotative movement of the coil 633. The frame 671 and the permanent magnet 636 are supported by a bracket 672 provided on the frame member 673 of the pen mounting, the frame member 673 being suitably supported from the frame 615.

A bracket 674 is provided on the frame member 673 and the pen arm 675 is pivotally mounted thereon, as indicated at 676. A spring finger 677 is provided at the upper end of the pen arm 675 above the pivotal mounting 676 thereof, and this spring finger bears against a cam surface 678 on the cam block 679 at the upper end of an arm 680 pivotally mounted as indicated at 681 on the frame member 673. A bearing 682 is provided on the frame member 673 and a pin 683 is slidably mounted therein and the arrangement is such that one end of the pin 683 bears on the arm 680 intermediate the pivotal mounting 681 thereof and the cam plate 679. A stem 684 is connected to and depends from the coil 633 and is pivotally connected to the pin 683, as indicated at 685. An ink reservoir 686 is provided at the lower end of the pen arm 675 and the pen 628 is pivotally connected to the outlet 687 of this reservoir, as indicated at 688.

Upon movement of the coil 633 clockwise, as viewed in Fig. 16, in response to the sensing of a systolic effect, the stem 684 acts through the pin 683 on the arm 680 to so move said arm that the cam surface 678 is moved relative to the spring finger 677 and thereupon the pen arm 675 and consequently the pen 628 are moved to the right, as viewed in Fig. 16, across the face of the web WG which, as best shown in Fig. 17, is preferably ruled. As the pen 628 moves across the ruled surface of the web WG a line is drawn and since at this time the web WG will be advancing at a predetermined rate of speed and since the distance the pen 628 will move is proportionate to the force and magnitude of the systolic effect that has been sensed, the line that will be drawn will be representative of the force and magnitude of the systolic effect and the length of time entailed in producing such effect. As explained hereinabove, a diastolic effect will be initiated as soon as the peak of a systolic effect is attained and inasmuch as the sensing of a diastolic effect causes the coil 633 to move counterclockwise, as viewed in Fig. 16, the pen 628 will move to the left, as viewed in Fig. 16, and resultantly a line representative of the sensed diastolic effect will be produced on the ruled face of the web WG.

The dicrotic phase of a heart beat accrues during the course of a diastole as an incident to the closing of the semilunar valves of the aorta and, inasmuch as such dicrotic phase entails an effect in the nature of a systolic effect, which accrues when the semilunar valves close, the line drawn by the pen 628 pertaining to the diastolic effect will show the peak entailed in the dicrotic phase of the heart beat. Thus the graph which will be drawn on the ruled face of the web WG in response to sensed systolic, and resultant diastolic, effects will, in the average person, have an appearance much like that shown in Fig. 17.

In the present apparatus where the web WG takes motion as soon as the machine is set in operation, the pen 628 will remain inoperative until the hereinabove described closed hydraulic system is established but thereafter, during the operation which proceeds to ascertain the pulse, the pen 628 will be operative to produce a graph of such pulse and the pen 628 will continue to so operate until, in the course of the operation which proceeds to ascertain the systolic blood pressure, the pressure impressed on the radial artery in the left arm of the user of the apparatus by the bulb 294 is sufficient to collapse such artery. This, as has been explained, interrupts the sensing of systolic and diastolic effects by the bulb 125, and therefore the pen 628 will remain at rest in position to inscribe a substantially straight line on the ruled face of the web WG away from the position assumed by the pen 628 upon interruption of the flow of blood through the radial artery past the volar aspect of the wrist with which the bulb or cushion 125 is engaged, which will have an effect, in so far as the present apparatus is concerned, in the nature of a diastolic effect. The pen 628 will continue to inscribe such a line on the ruled face of the web WG until the pressure impressed by the cushion 294 is overcome, in the manner hereinabove explained, whereupon the systolic and diastolic effects are again sensed by the bulb 125 with the result that a graphic illustration of the pulse will continue until operation of the machine is interrupted in the manner hereinabove described, i. e. by movement of wiper 61 off contact 63.

It will be noted (Figs. 18 and 19) that the web WG is led from the clamping roller 621 and the feed roller 622 through an opening 690 in a side wall of the casing 30z past a severing knife 691, the web WG being collected in a suitable collector 692 as it is fed through the opening 690. Thus at the end of an operation of the apparatus that part of the web WG on which the pen 628 has been operative to afford a graph of the pulse of the user will be extended beyond the knife 691 and may therefore be separated from the web, in the manner well understood in the art, by utilizing the knife 691 as a severing medium.

*Summary of operation*

The patron or subject seats himself before the machine and places his left arm in the arm rest 35z (Fig. 11), with the palm and fingers of the left hand resting face down against portion 37z thereof, straps 38z and 39z being fastened, and a proper coin deposited as aforesaid to cause closure of coin switch contact 48, which starts the machine upon a cycle of automatic operation.

Accordingly, the first thing to happen is the inflation of wrist cushion 125 to the requisite pressure to sense arterial pulsations at the wrist, which pulsations are translated into mechanical motion by the bellows 119 to operate the detector switch means 136 so that alternate systolic and diastolic pulses will correspondingly operate the systolic and diastolic relays.

Operation of the pulse count disc is under control of the systolic and diastolic relays, the disc 177, being constantly urged in movement through a frictional slip-drive with motor means 160, but which is normally restrained by clutch pawl 212.

The systolic pulses actuating the systolic relay S control the clutch index coil 200 to retract the pawl 212 and permit the index disc 177 to advance until the next diastolic pulse operates the diastolic relay D which will release the systolic relay and hence cause the index disc 177 to stop.

Succeeding systolic and diastolic pulses will cause repetitions of this advancing movement of the pulse rate indicating disc 177, until a predetermined or desired period of twenty records has elapsed, whereupon the pressure-testing phase starts automatically.

The upper, pressure, or artery-collapsing cushion 294 is not inflated during the pulse-rate ascertaining phase because electro-magnetic valve means 280 is open, hence all the air from pump P' is escaping.

After twenty seconds of pulse-test, wiper 191 leaves long contact 183, preventing further energization of index coil 200, and momentarily engages button contact 254, which closes electromagnetic valve means 256—280, causing the upper or artery constricting cushion or bulb 294 to become inflated to the requisite pressure, thus stopping, for the time being, pulses at the wrist. This pressure system automatically becomes a closed system by action of valve 286 in closing at the predetermined back-pressure.

The collapsing pressure in the closed system is now reduced step by step by action of bleeder means including alternately opening and closing valve means 307, 316, etc., operating under control of the pump lever and switch means 317—335—338.

This automatic reduction of pressure continues until blood again flows in the artery, which is determined by the fact that pulses again my be detected at the wrist bulb 125.

Since the internal pressure of the radial artery is sufficient to overcome the external, artificially-applied pressure in the closed system, which includes the pressure measuring device or manometer 303, the pressure indicated by the manometer for the closed system, at the time the blood flow is resumed, will be a measure of the relative blood pressure of the patron.

In order to prevent faulty or unreliable operation, more than one arterial pulsation must be detected at the wrist—preferably five, and the arrangement includes means for testing for a predetermined number of succeeding pulses before the pressure reducing means is finally cut off.

The aforesaid testing means includes the cam switch arrangement 340—341—349—351 cooperating with the step-up switch means including contacts 62—64 so that the latter contacts disengage upon the successive steps which must occur between any succeeding operations of the cam switch means and while contacts 340—341 thereof are closed.

The machine's cycle is concluded when the pulse rate and pressure tests are terminated, as aforesaid, the machine as an entirety shutting off when step-up contact wiper 61 leaves contact 63 after making the aforesaid requisite number of successive testing steps.

The indications of the pulse rate and pressure readings are registered as well as recorded. Pointer 252 or 252z on index disc 177 or 177x shows the pulse rate directly on a scale (e. g. 250z, Fig. 11), while the blood pressure is directly readable from manometer scale 398z (Fig. 11).

During the operation of the machine, the amplitude or "swing" of the systolic and diastolic pulsations is rendered clearly visible to the patron or subject by oscillation of the galvanometer pointer 566 (Fig. 11). The pressure variations in bellows 119z (or in the special housing 568, Fig. 14) are exerted upon the microphonic or piezo-electric crystal 569, which translates the fluid pressure variations into electric currents or pressures of corresponding amplitude and directional characteristics. These currents or voltages are suitably amplified by a circuit arrangement, such as shown in Fig. 13, which in turn actuates the galvanometer or other analogous electrical indicating device 565 correspondingly.

Tickets bearing a type imprint of the pulse rate and blood pressure readings, indicated visibly as aforesaid, are afforded by automatic operation of the mechanism of Figs. 2, 3, 4 as follows:

When the pulse-rate indicating disc 177x comes to rest to indicate a given pulse rate, printing type characters 425 on the rear of disc 177x, and corresponding to said given rate, will be positioned opposite the printing hammer or platen 426 (Fig. 9).

A short section of paper webbing W will be in position between the platen or hammer 426, an inked ribbon IR, and the particular type characters 425, so that when the machine finally shuts off as previously explained, magnet 429 becomes deenergized and permits spring 433 to throw the hammer 426—434 against the webbing and cause an imprint of the type characters upon the webbing to record the pulse rate.

A record of the systolic pressure reading will be imprinted upon the side of the common webbing opposite from that on which the pulse rate was imprinted as aforesaid. To this end, type drum 457 (Figs. 2, 3) is rotated by action of the bellows operated gear rack 452 so as to position type characters 458 (Fig. 3) opposite inked ribbon IR' and the second platen or printing hammer 459.

The pressure type drum is rotated as aforesaid during the pressure testing phase of the cycle, by reason of the fact that bellows 447—448 is connected to the closed pressure conduit system at 446, Fig. 1, and the position of gear rack (and hence the type drum) varies as the pressure in the closed system.

Imprinting of the pressure reading occurs simultaneously with that of the pulse rate reading by reason of the fact that coil 460, like magnet coil 429, becomes deenergized when the machine finally shuts off, releasing the printing armature and hammer or platen 459—464 for movement by spring 465 to impress the type characters through inked ribbon IR' onto the back of the web W.

Delivery of this printed record in the form of a ticket to the patron is accomplished by automatic action of knife or shear 477 (Fig. 4) in cutting through the webbing at the lower end of guide 437 under action of electromagnet 471 (which serves also to effect advancement of the webbing for the next ticket), which electromagnet is energized only after a delay sufficient to permit the two printing hammers or platens to operate upon deenergization of these respective electromagnets as aforesaid.

This action of the shear electromagnet 471 is effected by the time delay circuit of Fig. 10, including a dash pot controlled relay and slow-releasing relay 505 or other suitable means for causing magnet 471 to operate after a certain time lapse following action of the step switch means in finally shutting off the machine.

Webbing W is fed automatically upon deenergization of the shear electromagnet 471 by action of the associated advancing gear rack 485 (Figs. 4, 5, 6) and restoring spring 476.

The graph or cardiogram, such as depicted in Fig. 17, is made by the cardiograph unit including the stylus or pen 628 oscillating transversely of the moving ruled paper web WG, such movements of the stylus being effected by galvanometer coil 633, mechanically linked therewith. Feeble piezo-electric currents are set up by the transducer or piezo-electric crystal in response to pressure variations corresponding to systolic and diastolic pulses, and these currents are suitably amplified, as in the arrangement of Fig. 15, to oscillate the galvanometer coil.

Web WG is moved at the necessary predetermined rate by speed-reducing drive 625—626—627 to shaft 75z of the pump motor. The portion of the webbing WG, upon which the graph is thus traced, is fed into receptacle 692, from which it may be removed by the patron, who tears the section from the remainder of the web with the assistance of the stationery severing knife or shear 691 (Fig. 18).

The foregoing description discloses only a preferred arrangement and application of the invention, wherein the pulse rate is ascertained by utilization of a closed pressure system, and the systolic blood pressure is ascertained by another closed pressure system in which the pressure is automatically varied to bring about a balance between the exteriorly applied pressure and the arterial pressure, with the cooperation of pulse-sensing means associated with the first mentioned closed pressure system.

Means are disclosed for rendering the operations of the various instrumentalities in the novel combination entirely and reliably automatic, and make possible a practical and commercially feasible and reliable machine capable of giving the patron both direct reading visual indications of the pulse rate and blood pressure, as well as printed records of these data, together with a graphical representation of the wave form of the pulsations as to frequency, magnitude, and such individual idiosyncrasies as affect the rhythms and force of the pulses.

The hereinbefore described interlocking relay system under control of systolic and diastolic pulses insures counting and recording of true, successive, systolic and diastolic pulses, while the graphical representation of the pressure variations in the arterial system, utilizing piezo-electric principles, makes possible a faithful manifestation and recording of fluctuations and idiosyncrasies occurring throughout the cardiac cycle.

It is intended that all modifications and variations of the foregoing exemplary arrangements shall be included within the fair scope of the invention as defined in the appended claims, it being further understood that the mechanism as an entirety, as well as many of the instrumentalities thereof are obviously useful in other combinations and applications of basically analogous nature, all of which are likewise included within the fair scope of the invention at least to the extent indicated by the claims.

Having thus described our invention, what we claim as new and desire to patent by Letters Patent of the United States is:

1. In a coin-controlled apparatus for ascertaining the pulse rate and the systolic blood pressure of a user thereof, means for sensing systolic and diastolic effects in a selected artery of the user, a counter operated by said sensing means to count the pulse of the user, means arranged to afford a pressure system and including pressure-operated means positionable and operable to apply sufficient extraneous pressure to shut off flow of blood through a sensed artery of the user, means for supplying fluid under pressure to said pressure system, means operable to determine the pressure required in said closable system to equal the systolic blood pressure of the user, and operable to establish such required pressure in said system, pressure-responsive actuating means connected to said closable system and subjected to the pressure in said system, printing means including type settable by said pressure-responsive means to set said type for printing of the systolic blood pressure of the user, printing means associated with said counter and operable to print the pulse count indicated thereby, and means for effecting a printing operation of both of said printing means upon the completion of said pulse-counting and pressure-determining operations.

2 In a coin-controlled apparatus for ascertaining the pulse rate and the systolic blood pressure of a user thereof, means for sensing systolic and diastolic effects in a selected artery of the user, a counter operated by said sensing means to count the pulse of the user, means arranged to afford a pressure system and including pressure-operated means positionable and operable to apply sufficient extraneous pressure to shut off flow of blood through a sensed artery of the user, means for supplying fluid under pressure to said pressure system, means operable to determine the pressure required in said closable system to equal the systolic blood pressure of the user, and operable to establish such required pressure in said system, pressure-responsive actuating means connected to said closable system and subjected to the pressure in said system, printing means including type settable by said pressure-responsive means to set said type for printing of the systolic blood pressure of the user, printing means associated with said counter and operable to print the pulse count indicated thereby, means for effecting a printing operation of both of said printing means upon the completion of said pulse-counting and pressure-determining operations, and means operable to disable said counter during the operation of the blood pressure-determining means.

3. In a coin-controlled apparatus for ascertaining the pulse rate and the systolic blood pressure of a user thereof, means for sensing systolic and diastolic effects in a selected artery of the user, a counter actuated during a first predetermined timed portion of the operating cycle of the apparatus under control of said sensing means to count the sensed systolic effects and thereby determine the pulse rate of the user, means operable to render said sensing means ineffective upon said counter after said predetermined timed portion of the operating cycle, means arranged to afford a closable system and including pressure-operated means positionable and operable to apply sufficient extraneous pressure to shut off flow of blood through a sensed artery of the user to thereby interrupt such sensing, means operable in a second portion of said cycle to supply fluid under pressure to said closable system, means operable under the control of said sensing means to determine the pressure required in said closable system to equal the systolic blood pressure of the user, and operable at such required pressure to close said closable system, pressure-responsive actuating means connected to said closable system and subjected to the pressure in said system, printing means including type settable by said pressure-responsive means to set said type for printing of the systolic blood pressure of the user, printing means settable by said counter for printing of the pulse rate of the user as determined by said counter, and means operable to effect a printing operation of both of said printing means after completion of the pressure-determining operation.

4. The combination, with apparatus for detecting arterial pulsations, of pulse counting and recording means comprising a rotatable member, means for rotating said member, means providing an impositive driving connection between said member and rotating means, means normally restraining said member against rotation and operated by said detecting apparatus to render said restraining means momentarily ineffective responsive to detected systolic pulsations, whereby said member is freed to rotate a predetermined amount upon each detected systolic pulse, pulse-count printing type moved cooperably with said member with respect to imprint-receiving means by rotative movement of the rotatable member as aforesaid, and means for effecting imprint of type positioned as aforesaid following a predetermined amount of rotative movement of the rotatable member.

5. For a pulse count and blood pressure ascertaining apparatus including pulse detecting means and pressure manifesting means cooperable therewith, pulse recording means comprising: a pulse count indicator movable from a starting position under control of said detecting means, printing type carried by said indicator with respect to imprint-receiving means to print the pulse count indicated by the indicator in any of its various indicating positions, means for effecting pulse counting movements of said indicator for a predetermined period, means for automatically ascertaining and manifesting the blood pressure following each complete counting operation of said indicator, and means actuated automatically following the aforesaid pressure-ascertaining and manifesting operation to effect imprint of the type positioned as aforesaid at termination of said last-mentioned operation.

6. For a pulse count recording apparatus including pulse detecting means, recording mechanism comprising in combination therewith, printing type and means operating under control of said detecting means for a predetermined period to set pulse-rate indicating type into a printing position in correspondence with a number of pulses detected in said period, means for feeding imprint receiving material relative to said printing position, and means for automatically effecting imprint between said type and material positioned as aforesaid at a time after conclusion of said predetermined period.

7. For a pulse count and blood pressure recording apparatus including pulse actuating means and pressure-ascertaining means, recording mechanism comprising: pulse-rate indicating type and means operated under control of said detecting means for a predetermined period of time to move appropriate pulse-rate indicating type characters into a printing position in correspondence with a number of successive pulsations detected in said period of time, means for moving imprint-receiving material into printing position relative to the type moved as aforesaid, pressure-indicating type characters moved relative to a printing position under control of said pressure-ascertaining means into a printing relation with respect to said imprint-receiving material, and means for automatically causing imprinting engagement between the pulse rate and pressure type characters and material positioned as aforesaid following operation of the pressure-ascertaining means and movement of the pulse rate characters into printing position as aforesaid.

8. Apparatus as set forth in claim 7 and further characterized in that said imprint-receiving material is provided in the form of a continuous web, and there is additionally included means for severing the imprinted portion of said web from other portions thereof, and means for actuating said severing means following imprinting as aforesaid.

9. In apparatus of the class described including pulse-detecting and pressure-ascertaining means, recording mechanism comprising: means for delivering imprint-receiving material to a printing position, a movable type carrier having a succession of pulse-rate characters thereon and arranged for movement to present said characters selectively in printing relation to a surface on said material; a second movable type carrier having a succession of pressure characters thereon and arranged for movement to present said characters selectively in printing relation to another surface of said material opposite said first-mentioned surface; means under control of said detecting means for moving said first carrier to selectively present characters corresponding to a number of pulsations in a certain period at said printing position; means under control of said ascertaining means for moving said second carrier to selectively present characters to indicate one or another pressure ascertained thereby; and means for automatically causing imprinting engagement between said characters in printing position and respective surfaces on said material following selective movements of the carriers as aforesaid.

10. For a pulse rate indicating apparatus including detecting means for sensing systolic and diastolic pulses, a pulse-rate indicator comprising in combination: a revoluble index member; means for rotatively moving said member in a given direction; means providing an impositive driving connection between said member and said moving means; releasable means normally restraining said index member against movement; means controlled by said detecting means for releasing said releasable means for periods corresponding to an interval between successively detected systolic and diastolic pulses, whereby the index member may move predetermined amounts in such periods; said index member having arranged thereon a succession of pulse-rate printing characters of increasing value in the direction of movement of said index member; means rendering said releasing means operable for a desired time interval during each cycle of movement of the index member from a starting position; means for effecting movement of the index member to said starting position once during each revolution thereof; and means for effecting imprint of said characters at a certain index position with imprint-receiving material at a time following the last-mentioned desired time interval; together with means for initiating movement of the index member from said starting position under control of said detecting means.

11. The combination, with means for detecting systolic and diastolic pulses and pressure-ascertaining means, of recording mechanism including: a first print carrier having pulse-rate printing characters thereon; a second print carrier having pressure indicating characters thereon; means for feeding an imprint-receiving web into print-receiving relation respective to said carriers; translating means cooperable with said detecting means for translating systolic and diastolic pulsations into corresponding electrical values, cardiograph means controlled by said translating means for producing a graphic representation of said pulsations; means operable for a measured time interval to move said first carrier into a starting position and from said starting position step by step to an advanced position under control of said detecting means to cause the first carrier to present pulse rate characters in a printing position relative to said web corresponding to a number of pulses detected in said measured interval; said cardiograph means being actuated under control of the said number of detected pulses during the same measured interval; means operable at the conclusion of said interval under control of said pressure-ascertaining means to selectively move the second carrier to present pressure characters corresponding to an ascertained pressure in printing relation to said web; and means for effecting imprint of the aforesaid positioned characters on both carriers following selecctive movement of the second carrier as aforesaid.

12. The combination, with means for detecting systolic and diastolic arterial pulsations, of recording mechanism including: an unidirectionally rotatable index member and means for rotatively driving the same in cycles from a starting position; means controlled by said detecting means for effecting advance of said index member from starting position by said driving means during any cycle of movement thereof various amounts depending upon the number of pulsations detected in a predetermined time interval; means for translating said number of detected pulsations into correspondingly varying electrical currents; and cardiographic translating means controlled by said first translating means for graphically depicting the magnitude and directional characteristics of said pulsations during said predetermined interval; together with means for initiating cyclic operation of said index.

13. The combination defined in claim 12 further characterized by the provision of pulse rate printing characters moved by said index member relative to an imprint receiving surface, and means for effecting imprint of characters moved as aforesaid at a time between conclusion of the aforesaid predetermined interval and completion of said cyclic operation of the index member.

14. In a pulse rate recorder, an indicating disc and means mounting the same for rotative indicating movement; means for effecting indicating movement of said disc from a starting position; indicating means for direct reading indication of pulse rate on one face of said disc; pulse rate printing characters on an opposite face of said disc; means for positioning an imprint receiving surface at a printing position relative to said characters; and means for effecting imprint of characters at said printing position on said surface.

15. In a pulse rate recorder, a cyclically movable pulse rate indicator; means adapted for control by a pulse detector for effecting step by step advance of said indicator from a starting position to an indicating position; means cooperable with said last mentioned advancing means for effecting restoration of said indicator to said starting position prior to initiation of each cycle of operation thereof; means for initiating said cycles of operation; pulse rate printing characters moved cooperably in step with said indicator relative to a printing position; means for feeding imprint receiving material relative to said printing position; a printing platen mounted for movement to effect printing engagement between characters at said printing position and said material; means for inking said characters, and means for automatically actuating said platen at a time following each advance of the indicator and prior to restoration of the same to starting position.

16. In a device of the class described including pulse sensing and pressure ascertaining means, recording mechanism comprising in combination: a type carrier having pressure indicating characters thereon; means under control of said pressure ascertaining means for effecting movement of said type carrier to selectively dispose said characters at a printing position in correspondence to an ascertained pressure; a second type carrier having pulse rate characters thereon, and means under control of said sensing means for effecting movement of said second carrier to selectively dispose said characters thereof at a printing position adjacent said first mentioned printing position in correspondence to a number of pulses sensed in a given period of time; means for feeding a common imprint receiving web into juxtaposition with both said printing positions; means for inking the characters of both carriers; means operatively associated with each said carrier for effecting imprint between said common web and characters respectively disposed as aforesaid at said printing positions; together with means for actuating said imprint effecting means.

17. The combination defined in claim 16 further characterized in that said means thereof for actuating the imprint effecting means is arranged and constructed for operation to effect actuation of both said imprint effecting means simultaneously for operation after both of said type carriers have been moved to selectively dispose indicating characters respectively in printing positions as aforesaid.

18. In an apparatus of the character described, a hydraulic pressure system including a liquid-expansible member adapted to embrace a portion of the human arm over one of the arteries therein and said liquid-expansible member being sensitive to systolic and diastolic effects in said artery, said hydraulic pressure system including means for forcing liquid under pressure into said liquid-expansible member, and including means responsive to said systolic and diastolic effects for isolating said liquid-expansible member and the adjacent portion of said hydraulic pressure system from the remainder of said hydraulic pressure system after the pressure in said liquid-expansible member has attained a predetermined value, said hydraulic pressure system including a control member embodying a pressure-responsive electro-generative element, and means for subjecting the latter to pneumatic pressure variations correspondingly responsive to the systolic and diastolic effects in the isolated portion of said hydraulic pressure system, and including an electrically-operated indicating device under the control of said control member and its aforesaid movable element for manifesting the magnitude of said systolic and diastolic effects to a user of the apparatus.

19. In an apparatus of the character described, a hydraulic pressure system including a liquid-expansible member adapted to embrace a portion of the human arm over one of the arteries therein and said liquid-expansible member being sensitive to systolic and diastolic effects in said artery, said hydraulic pressure system including means for forcing liquid under pressure into said liquid-expansible member, and including means responsive to said systolic and diastolic effects for isolating said liquid-expansible member and the adjacent portion of said hydraulic pressure system from the remainder of said hydraulic pressure system after the pressure in said liquid-expansible member has attained a predetermined value, a pneumatic pressure variator actuated by pressure-responsive means in said hydraulic pressure system, a pressure-sensitive electro-generative control member actuated by said variator responsive to the systolic and diastolic effects in the isolated portion of said hydraulic pressure system, and a galvanometer under the control of said control member and its aforesaid movable element for manifesting the magnitude of said systolic and diastolic effects to a user of the apparatus.

20. In an apparatus for ascertaining arterial tension, in combination: means for applying extraneous pressure to an artery; sensing means responsive to systolic and diastolic pulses in said artery; means acting automatically under control of said sensing means responsive to the sensing by the latter of a multiplicity of pulsations of predetermined number to vary said extraneous pressure uniformly in steps of substantially fixed quantitative value until effective balance between said extraneous pressure and the tension or pressure in said artery is reached; and means for manifesting the value of the extraneous pressure balanced as aforesaid.

21. Apparatus as defined in claim 20 and further characterized by the provision of means cooperable with said sensing means for testing for a predetermined number of pulses, greater than one, between each said step in pressure variation whereby to limit possibility of error due to false, anomalous, or irregular pulses in the aforesaid action of said pressure varying means.

22. In an apparatus for automatically ascertaining the systolic blood pressure of a user thereof, means for applying extraneous pressure to one of the arteries of a user to a predetermined pressure level sufficient to shut off flow of blood through said artery, mechanism operable automatically after said predetermined pressure level has been attained and without intervention of any human agency to gradually reduce said extraneous pressure in a succession of relatively small decrements, means operable to sense the resumption of blood flow in said artery, means operable automatically under the control of said sensing means for interrupting the reduction of the extraneous pressure when such pressure is reduced sufficiently to enable the flow of blood to be resumed in said artery, and testing means cooperable with said sensing means requiring the sensing of a plurality of arterial pulses in the interval between succeeding decrements before the interruption aforesaid is finally effected, and means for manifesting the degree of extraneous pressure when reduction thereof is interrupted to thereby manifest the systolic blood pressure of the user.

23. In an apparatus for ascertaining the systolic blood pressure of a user thereof, means for sensing the flow of blood in a selected artery of a user, means for applying sufficient extraneous pressure to said artery to shut off flow of blood through said artery, mechanism operable automatically to gradually reduce the extraneous pressure on said artery applied to aforesaid, means under control of the sensing means for interrupting the reduction of the extraneous pressure when such pressure is reduced sufficiently to enable the flow of blood to be resumed therein, timing means operable under the control of said sensing means to initiate further operation of said pressure-reducing means when the sensed resumption of blood flow does not continue throughout a predetermined timing period, and means operable to manifest the degree of extraneous pressure when reduction thereof is interrupted to thereby manifest the systolic blood pressure of the user.

24. An automatic apparatus for ascertaining the systolic blood pressure of a user, comprising, in combination, a closable fluid pressure system including expansible means adapted to be clamped about a body surface over an artery and expansible by fluid pressure in said system to shut off the flow of blood in said artery, a normally closed pressure relief passage connected to said closed system and including a measuring chamber of predetermined capacity terminating in a venting outlet, a first valve between said chamber and said system, an outlet valve in said outlet, means operable to automatically open said valves alternately after said system has been closed whereby said chamber is charged from said system while said outlet valve is closed and is vented through said outlet when said first valve is closed, sensing means operable to sense the resumption of a blood flow in said artery, and pressure-manifesting means operatively connected to said closable system and operable when such resumption of blood flow is sensed to manifest the pressure in said system.

25. The combination defined in claim 24 further characterized by the inclusion therein of means cooperable with said sensing means for testing for a plurality of pulses in the interim between such alternate operation of said first and outlet valves and effective when said plurality of pulses is detected to arrest said alternate operation and maintain the pressure then existing in said system for manifestation as set forth.

26. In an apparatus for automatically ascertaining the pulse rate and the systolic blood pressure of a user, and having an automatic operating cycle in one portion of which the pulse rate is ascertained and in another portion of which the systolic blood pressure is attained, pressure-applying means operable automatically during said blood-pressure-ascertaining portion of said cycle to apply extraneous fluid pressure to a selected artery of the user to a pressure level equal to the systolic blood pressure of the user, and pulse rate ascertaining means including a counter, and sensing means operable automatically to sense pulse effects in said artery and operable upon said counter during the pulse-ascertaining portion of said cycle to ascertain the pulse rate of the user and operable during the blood pressure-ascertaining portion of said cycle to determine the pressure level required in said pressure-applying means to equal the systolic blood pressure of the user, together with mechanism operably associated with said pressure applying means and said rate ascertaining means and operable automatically to actuate the same in sequence during each cycle of operation of said apparatus, and means operable to initiate the cyclic operation of said apparatus.

27. In a blood pressure measuring apparatus having a fluid-displacement system including a body applicator for sensing arterial pulses, improved control means comprising: an electrical control device actuated responsive to displacement variations in said system, means operating in a succession of intervals to effect quantitative change in the displacement in said system, means under control of said electrical control device to be actuated by the latter in a succession of more than two steps for preventing a change in displacement by said quantitative changing means during one of said intervals, and for preventing further displacement change during succeeding intervals of a testing operation of said apparatus provided a predetermined number of said successive steps, in addition to the aforesaid two steps, is taken by the aforesaid means which is to be actuated in a succession of steps.

28. In a blood pressure measuring apparatus, a pair of fluid-inflated body applicators adapted to be placed relative to an artery, means for automatically inflating one of said applicators to a pressure sufficient to cause pulsating fluid displacements therein responsive to arterial pulses, a control device actuated by said pulsating displacements, means actuated automatically under control of said control device for inflating the other applicator to a pressure sufficient to prevent blood flow in said artery, means operable automatically to relieve pressure in said other applicator in uniform decrements, said last-mentioned means being rendered ineffective by said control device as a result of occurrence of a predetermined number of pulsating displacements occurring in succession in said first applicator.

29. In a blood pressure measuring apparatus, fluid-inflatable body applicator means adapted to be placed relative to an artery; means controlling operation of said apparatus in complete testing cycles, means operable automatically in each cycle to inflate said applicator means to a pressure at which arterial pulsations cause corresponding fluid-displacement reactions in said applicator means; a control device actuated by said reactions; counting means actuated under control of said control device; means operable under supervision of said counting means and dependent upon the counting thereby of a predetermined number of successive pulse reactions for causing a change in the pressure in said applicator means, said pressure change having as one of its limits a value above the systolic pressure of an artery under test, and as its other limit, the approximate systolic pressure of said artery, and means for automatically restoring said apparatus to a starting condition as an incident to each cyclic testing operation thereof.

30. In a cardiometric apparatus, a fluid-displacement device adapted to be actuated responsive to arterial pulsations, a second fluid-displacement device mechanically connected with said first device for actuation by the latter to produce corresponding displacement reactions, a pressure-actuated electrical translating device arranged to be actuated by displacement reactions in said second displacement device and adapted to control an indicating instrumentality and a control switch having an operating member actuated by said mechanical connection between the first and second displacement devices.

31. In apparatus of the class described, a first fluid displacement device adapted to be connected in a pulse-controlled fluid displacement system, a second fluid displacement device actuated by the first said device through the agency of movable body means, whereby the displaceable fluid in the first device is kept separate from that in the second said device, and pressure-actuated electrical control means so confined and connected with respect to said second device as to be actuated by pressure variations in the latter induced under control of said first device.

32. In cardiometric apparatus of the class described, a fluid-displacement device adapted to be actuated responsive to arterial pulsations, a second fluid-displacement device mechanically connected with said first device for actuation by the latter to produce corresponding displacement reactions, a pressure-actuated electrical translating device arranged to be actuated by displacement reactions in said second displacement device and adapted to control an indicating instrumentality in said apparatus, and a control switch having an operating member actuated by said mechanical connection between the first and second displacement devices, the actuating connection between said mechanical connection and switch operating member being impositive to permit relatively unlimited operating movements of said mechanical connection with respect to predetermined limits of movements of said operating member.

BRADLEE W. WILLIAMS.
HOMER S. WILLIAMS.